(12) United States Patent
Kaneko et al.

(10) Patent No.: US 7,281,516 B2
(45) Date of Patent: Oct. 16, 2007

(54) IGNITION TIMING CONTROL DEVICE OF INTERNAL COMBUSTION ENGINE

(75) Inventors: Rihito Kaneko, Nishikamo-gun (JP); Kenji Kasashima, Nishikamo-gun (JP); Masatomo Yoshihara, Toyota (JP); Koji Aso, Susono (JP); Kenji Senda, Okazaki (JP); Shigeru Kamio, Nagoya (JP); Yuichi Takemura, Anjo (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 0 days.

(21) Appl. No.: 11/452,313

(22) Filed: Jun. 14, 2006

(65) Prior Publication Data

US 2006/0288981 A1 Dec. 28, 2006

(30) Foreign Application Priority Data

Jun. 28, 2005 (JP) ............................. 2005-188463

(51) Int. Cl.
*F02P 5/152* (2006.01)

(52) U.S. Cl. .............................. 123/406.38; 123/406.34

(58) Field of Classification Search ........... 123/406.29, 123/406.33, 406.34, 406.37, 406.38, 435; 701/111; 73/35.04, 35.06, 35.07, 35.09
See application file for complete search history.

(56) References Cited

U.S. PATENT DOCUMENTS

| 6,561,163 | B1 * | 5/2003 | Takahashi et al. ..... 123/406.21 |
| 6,688,286 | B2 * | 2/2004 | Kokubo et al. ........ 123/406.33 |
| 6,748,922 | B2 * | 6/2004 | Uchida et al. ......... 123/406.38 |
| 7,007,663 | B2 * | 3/2006 | Mashiki ................... 123/305 |
| 7,043,353 | B2 * | 5/2006 | Takemura et al. .......... 701/111 |
| 7,054,735 | B2 * | 5/2006 | Masuda et al. ............. 701/111 |
| 7,181,338 | B2 * | 2/2007 | Takemura et al. .......... 701/111 |
| 2006/0288982 | A1 * | 12/2006 | Kaneko et al. ........ 123/406.39 |
| 2007/0084266 | A1 * | 4/2007 | Kaneko et al. ............. 73/35.03 |

FOREIGN PATENT DOCUMENTS

| JP | 64-12070 | 1/1989 |
| JP | 2000-265933 | 9/2000 |
| JP | 2003-21032 | 1/2003 |
| JP | 2005-23902 | 1/2005 |

* cited by examiner

*Primary Examiner*—Hai Huynh
(74) *Attorney, Agent, or Firm*—Oblon, Spivak, McClelland, Maier & Neustadt, P.C.

(57) ABSTRACT

An engine ECU executes a program including the steps of: comparing a vibration waveform of an engine and a knock waveform model stored in advance to calculate a correlation coefficient K; prohibiting correction when a correction prohibiting condition of a determination value V(KX) is satisfied, the determination value V(KX) compared with a knock magnitude N calculated from the correlation coefficient K so as to control the ignition timing; and correcting the determination value V(KX) based on a magnitude value LOG(V) calculated from a magnitude V of vibration in an ignition cycle in which the correlation coefficient K greater than a threshold value K(1) is calculated when the correction prohibiting condition of determination value V(KX) is not satisfied. The correlation coefficient K is calculated as a smaller value when the vibration waveform includes a waveform of vibration of a noise component as compared with that when the vibration waveform does not include it.

32 Claims, 17 Drawing Sheets

US 7,281,516 B2

IGNITION TIMING CONTROL DEVICE OF INTERNAL COMBUSTION ENGINE

This nonprovisional application is based on Japanese Patent Application No. 2005-188463 filed with the Japan Patent Office on Jun. 28, 2005, the entire contents of which are hereby incorporated by reference.

BACKGROUND OF THE INVENTION

1. Field of the Invention

The present invention relates to an ignition timing control device of an internal combustion engine and particularly to a technique of controlling ignition timing based on a waveform of vibration generated in the internal combustion engine.

2. Description of the Background Art

Conventionally, there have been proposed various methods of determining whether knocking (knock) is present or absent. A knock control device of an internal combustion engine described in Japanese Laid-Open Patent Publication No. 2003-021032 includes a knock sensor for detecting a knock of the internal combustion engine, a statistical processing portion for statistically processing an output signal detected by the knock sensor, a first temporary determination portion for determining whether or not the knock has occurred based on a processing result by the statistical processing portion, a second temporary determination portion for determining whether or not the knock has occurred based on a waveform of the output signal detected by the knock sensor, and a final knock determination portion for finally determining whether or not the knock has occurred based on the results of the knock temporary determination by the first temporary determination portion and the knock temporary determination by the second temporary determination portion. The final knock determination portion finally determines that whether or not the knock has occurred when both the first temporary determination portion and the second temporary determination portion determine that the knock has occurred.

With the knock control device described in this official gazette, the knock temporary determination by a statistical processing program and the knock temporary determination by a waveform program are used and it is finally determined that the knock has occurred only when it is determined that the knock has occurred in the respective temporary determinations. Thus, with regard also to an output signal based on which knocking was detected erroneously by knocking determination using only one of the statistical processing program and the waveform program, it is possible to accurately determine whether or not the knocking has occurred.

However, in the knock control device described in Japanese Laid-Open Patent Publication No. 2003-021032, the knocking determination by the statistical processing and the knocking determination by a shape of the waveform are performed independently of each other. Therefore, accuracy of each determination method is not improved and deterioration of the accuracy by a noise component is not resolved in each determination method. Therefore, the device is susceptible to further improvement so as to accurately determine whether the knocking is present or absent and to accurately perform retard control of the ignition timing at the time of knocking. Moreover, because the ignition timing is retarded without consideration of a load of the internal combustion engine when the knocking has occurred, the ignition may be conducted at such improper timing that an output of the internal combustion becomes insufficient depending on the load.

SUMMARY OF THE INVENTION

It is an object of the present invention to provide an ignition timing control device of an internal combustion engine and for properly controlling the ignition timing.

According to an aspect of the present invention, there is provided an ignition timing control device of an internal combustion engine, the device including: a knock magnitude calculating portion for calculating knock magnitude related to magnitude of vibration due to knocking based on magnitude of vibration occurring in the internal combustion engine (100); a control portion for controlling ignition timing of the internal combustion engine based on a result of comparison between the knock magnitude and a predetermined determination value; a waveform detecting portion for detecting a waveform of the vibration occurring in the internal combustion engine at predetermined intervals; a memory portion for storing a waveform which is a standard of the vibration of the internal combustion engine; a detecting portion for detecting magnitude values related to the magnitude of the vibration occurring in the internal combustion engine in a plurality of ignition cycles; an extracting portion for extracting a magnitude value satisfying a predetermined first condition from the plurality of magnitude values based on a result of comparison between the detected waveform and the stored waveform; a correcting portion for correcting the predetermined determination value based on the extracted magnitude value; and a prohibiting portion for prohibiting correction of the predetermined determination value when a predetermined second condition is satisfied.

According to the present invention, the knock magnitude related to the magnitude of the vibration due to the knocking is calculated based on the magnitude of the vibration occurring in the internal combustion engine and the ignition timing of the internal combustion engine is controlled based on the result of comparison between the knock magnitude and the predetermined determination value. However, magnitude of the same vibration occurring in engine may be detected as different values by a knock sensor and the calculated knock magnitude may be different due to variation in the output values and degradation of a knock sensor, for example. In this case, the ignition timing which was controlled properly in an initial state of the internal combustion engine may become improper. Therefore, it is necessary to correct the determination value according to a state of vibration occurring in the internal combustion engine so that retard control of the ignition timing is carried out frequently when it can be said that a frequency of occurrence of knocking is high, for example. However, as the vibration occurring in the internal combustion engine, there are vibrations due to vibrations of noise components such as vibrations due to seating of intake valves and exhaust valves and fuel injection from injectors in addition to the vibration due to knocking. Therefore, it is necessary to correct the determination value in consideration of the vibrations of the noise components. For this purpose, the waveform of the vibration occurring in the internal combustion engine is detected at predetermined intervals and the detected waveform is compared with the waveform stored as the waveform of the vibration due to knocking, for example. Moreover, the magnitude values related to the magnitude of the vibration occurring in the internal combustion engine are detected in the plurality of ignition cycles, and the magnitude value satisfying the predetermined first condition is extracted from the detected plurality of magnitude values based on the result of comparison between the detected waveform and the stored waveform. Thus, the magnitude values in the ignition cycle in which the waveform is the same or similar to the waveform of the vibration due to the vibration of the noise components are not extracted and other magnitude values can be extracted. In other words, the magnitude values of the vibrations due to the vibrations of the noise components can be removed. Based on such magnitude values, the determination value is corrected. In this way, it is possible to properly correct the determination value and to properly control the ignition timing based on a condition of vibration in a past ignition cycle in which influence of the noise components is suppressed. For example, when it can be said that a frequency of occurrence of knocking is high, it is possible to correct the determination value so that the ignition timing can be retarded more frequently when the knocking occurs. Conversely, when it can be said that a frequency of occurrence of knocking is low, it is possible to correct the determination value so that the ignition timing can be advanced more frequently when knocking does not occur. However, if the determination value is corrected to thereby retard the ignition timing in a high-load range, output of the internal combustion engine decreases and necessary output cannot be obtained in some cases. On the other hand, if the determination value is corrected to advance the ignition timing when the ignition timing is set close to MBT (Minimum advance for Best Torque) with which torque becomes a maximum value in a range in which knocking does not occur or in a low-load range in which there is a low possibility that knocking occurs, knocking becomes more likely to occur. Therefore, when the load of the internal combustion engine is higher than the predetermined load, when the load of the internal combustion engine is lower than the predetermined load, and when a difference between the actual ignition timing and the predetermined ignition timing is smaller than the predetermined value, correction of the determination value is prohibited. In this way, it is possible to suppress more correction of the determination value than necessary. Therefore, the ignition timing can be controlled to be timing suitable to an operation state of the internal combustion engine. As a result, it is possible to provide the ignition timing control device of the internal combustion engine for properly controlling the ignition timing.

The predetermined intervals are preferably predetermined intervals of a crank angle.

According to the present invention, the waveform of the vibration occurring in the internal combustion engine is detected at predetermined intervals of the crank angle. As a result, it is possible to detect the waveform of the vibration at timing at which knocking may occur in each ignition cycle. The waveform detected in this manner is compared as the waveform stored as the waveform of the vibration due to knocking, for example. In this way, it is possible to accurately determine whether the detected waveform is the waveform of the vibration due to knocking or the waveform of the vibration due to the noise component.

Furthermore, the waveform which is the standard of the vibration of the internal combustion engine is preferably stored in advance.

According to the present invention, the waveform formed by experiment or the like is stored in advance. As a result, the waveform which is formed accurately to be the standard can be stored. This waveform and the detected waveform are compared with each other. In this way, it is possible to accurately determine whether the detected waveform is the waveform of the vibration due to knocking or the waveform of the vibration due to the noise component.

Moreover, the predetermined second condition is preferably a condition that a load of the internal combustion engine is higher than a predetermined load.

According to the present invention, when the condition that the load of the internal combustion engine is higher than the predetermined load is satisfied, correction of the determination value is prohibited. In this way, it is possible to suppress decrease in output of the internal combustion engine due to correction of the determination value and retarding of the ignition timing in the high-load range. As a result, it is possible to properly control the ignition timing.

Furthermore, the predetermined second condition is preferably a condition that a load of the internal combustion engine is lower than a predetermined load.

According to the present invention, when the condition that the load of the internal combustion engine is lower than the predetermined load is satisfied, correction of the determination value is prohibited. In this way, it is possible to prevent knocking from becoming more likely to occur due to correction of the determination value and advancing of the ignition timing in the low-load range in which there is a low possibility that knocking occurs. As a result, it is possible to properly control the ignition timing.

Moreover, the predetermined second condition is preferably a condition that a difference between the ignition timing of the internal combustion engine and predetermined ignition timing is smaller than a predetermined value.

According to the present invention, when the condition that the difference between the ignition timing of the internal combustion engine and the predetermined ignition timing is smaller than the predetermined value is satisfied, correction of the determination value is prohibited. In this way, it is possible to prevent knocking from becoming more likely to occur due to correction of the determination value and advancing of the ignition timing in the range in which there is a low possibility that knocking occurs because the ignition timing is close to MBT. As a result, it is possible to properly control the ignition timing.

Furthermore, it is preferable that the ignition timing control device further includes a deviation calculating portion for calculating a value related to a deviation of the detected waveform and the stored waveform from each other. The deviation calculating portion calculates the value related to the deviation as a smaller value when the detected waveform includes a waveform of vibration due to actuation of a predetermined part of the internal combustion engine than that when the detected waveform does not include it. The predetermined first condition is a condition that the magnitude value is a magnitude value in an ignition cycle in which a greater value related to the deviation than a predetermined value is calculated. The knock magnitude calculating portion calculates the knock magnitude based on the value related to the deviation and the magnitude of the vibration occurring in the internal combustion engine at the predetermined intervals.

According to the present invention, based on the result of comparison between the detected waveform and the stored waveform, the value related to the deviation of the detected waveform and the stored waveform from each other is calculated. The value related to the deviation is calculated as the smaller value when the detected waveform includes the waveform of the vibration (vibration of the noise component) due to actuation of the predetermined part of the internal combustion engine than that when the detected waveform does not include it. The magnitude value satisfying the condition that the value is the magnitude value in the ignition cycle in which the greater value related to the deviation than the predetermined value is calculated is extracted from the magnitude values detected in the plurality of cycles. In this way, it is possible to suppress mixture of the magnitude value in the ignition cycle in which the waveform including the waveform of the vibration of the noise component is detected into the extracted magnitude value. In other words, it is possible to extract the magnitude value excluding the magnitude value of the vibration of the noise component. Therefore, it is possible to properly correct the determination value based on the condition of the vibration in the past ignition cycle in which the influences of the noise components are suppressed. The knock magnitude compared with such determination value is calculated based on the value related to the deviation and the magnitude of the vibration occurring in the internal combustion engine at the predetermined intervals. In this way, it is possible to obtain the knock magnitude in consideration of a shape of the waveform and the magnitude of the vibration. The ignition timing is controlled based on such knock magnitude. Therefore, it is possible to clearly distinguish between the vibration due to the knocking and the vibration due to a factor other than the knocking to properly control the ignition timing.

Moreover, it is preferable that the ignition timing control device further includes an integrated value calculating portion for calculating an integrated value obtained by integrating the magnitude of the vibration occurring in the internal combustion engine at the predetermined intervals for the predetermined interval. The knock magnitude calculating portion calculates the knock magnitude based on a product of the value related to the deviation and the integrated value.

According to the present invention, the integrated value obtained by integrating the magnitude of the vibration occurring in the internal combustion engine at the predetermined intervals for the predetermined interval is calculated. The vibration due to the knocking attenuates slowly and the vibration due to the noise component attenuates swiftly. Therefore, a difference between the integrated value of the magnitude of the vibration due to the knocking and the integrated value of the magnitude of the vibration due to the noise component is large. Based on the product of the integrated value and the value related to the deviation, the knock magnitude is calculated. In this way, the knock magnitude with a large difference between the knocking and the noise can be obtained. Based on such knock magnitude, the ignition timing is controlled. Therefore, it is possible to clearly distinguish between the vibration due to the knocking and the vibration due to the noise component to thereby properly control the ignition timing.

Furthermore, the predetermined value is preferably a maximum value of values related to a deviation calculated when the internal combustion engine is operated so that the vibration due to actuation of the predetermined part occurs at the predetermined intervals.

According to the present invention, the magnitude value in the ignition cycle in which the greater value related to the deviation than the maximum value of the values related to the deviation calculated when the internal combustion engine is operated so that the vibration due to actuation of the predetermined part occurs at the predetermined intervals is extracted. In this way, it is possible to extract the magnitude value while excluding the magnitude value which is considered to be the magnitude value of the vibration of the noise component. Therefore, it is possible to correct the determination value based on the magnitude value which is considered not to be the magnitude value of the vibration of the noise component. Therefore, it is possible to properly correct the determination value based on the condition of the vibration in the past ignition cycle in which the influences of the noise components are suppressed.

Moreover, the predetermined part is preferably at least one of a piston, an injector, a suction valve, and an exhaust valve.

According to the present invention, it is possible to suppress the noise component generated due to at least one of the piston, injector, the intake valve, and the exhaust valve to accurately determine the knocking occurrence state.

Furthermore, it is preferable that the ignition timing control device further includes a level calculating portion for calculating a knock determination level based on the extracted magnitude value. The correcting portion corrects the predetermined determination value based on a result of a comparison between the extracted magnitude value and the knock determination level.

According to the present invention, the knock determination level is calculated based on the extracted magnitude value. In this way, it is possible to obtain the knock determination level on which the magnitude value in the past ignition cycle is reflected. Therefore, it is possible to obtain the knock determination level in consideration of influences of the operation state and individual specificity of the internal combustion engine on the magnitude value. The determination value is corrected based on the result of the comparison between the knock determination level and the extracted magnitude value. In this way, it is possible to obtain the proper determination value according to the operation state and the individual specificity of the internal combustion engine. The ignition timing is controlled based on such determination value. Therefore, it is possible to properly control the ignition timing.

Moreover, the correcting portion preferably corrects the predetermined determination value when a frequency with which the magnitude value greater than the knock determination level is extracted is higher than a predetermined frequency.

According to the present invention, the determination value is corrected when the frequency with which the magnitude value greater than the knock determination level is extracted is higher than the predetermined frequency. In this way, it is possible to make the ignition timing likely to be retarded when it can be said that the frequency of occurrence of the knocking is high. Therefore, it is possible to properly control the ignition timing according to the knocking occurrence state.

Furthermore, the level calculating portion preferably calculates the knock determination level by adding a product of a standard deviation in the extracted magnitude value and a predetermined coefficient to a median value in the extracted magnitude value.

According to the present invention, the knock determination level is calculated by adding the product of the standard deviation in the extracted magnitude value and the predetermined coefficient to the median value in the extracted magnitude value. In this way, it is possible to obtain the knock determination level on which the magnitude value in the past ignition cycle is reflected. Therefore, it is possible to obtain the knock determination level in consideration of influences of the operation state and individual specificity of the internal combustion engine on the magnitude value. The determination value is corrected based on the result of the comparison between the knock determination level and the extracted magnitude value. In this way, it is possible to obtain the determination value according to the operation state and the individual specificity of the internal combustion engine. The ignition timing is controlled based on such determination value. Therefore, it is possible to properly control the ignition timing.

Moreover, it is preferable that the ignition timing control device further includes a fuel-by-fuel control portion for controlling the ignition timing according to a type of fuel of the internal combustion engine.

According to the present invention, the ignition timing is controlled according to the type of fuel. For example, when regular gasoline is used, the ignition timing is retarded as compares with the case in which premium gasoline (high-octane gasoline) is used. As a result, it is possible to suppress occurrence of knocking.

Furthermore, the fuel-by-fuel control portion preferably controls the ignition timing of the internal combustion engine when correction of at least the predetermined determination value is prohibited.

According to the present invention, the ignition timing is controlled according to the type of fuel when correction of at least the determination value is prohibited. In this way, even when correction of the determination value is prohibited in the high-load range, for example, the ignition timing is retarded when the regular gasoline is used as compared with the case in which the premium gasoline is used. Therefore, it is possible to suppress excessive occurrence of the knocking.

According to another aspect of the present invention, there is provided an ignition timing control device of an internal combustion engine, the device including: a detecting portion for detecting vibration due to knocking; a control portion for controlling ignition timing by comparing a value representing a characteristic of the vibration of the knocking with a predetermined threshold value; a correcting portion for correcting the threshold value based on a frequency of occurrence of the knocking; and a prohibiting portion for prohibiting correction of the threshold value when a predetermined condition is satisfied.

According to the present invention, the vibration due to the knocking is detected and the ignition timing is controlled by comparing the value representing the characteristic of the vibration of the knocking with the threshold value. However, the same vibration occurring in the internal combustion engine may be detected as different vibrations by the knock sensor and the value representing the characteristic of the vibration of the knocking may be different due to variation in the output values and degradation of the knock sensor, for example. In this case, the ignition timing which was controlled properly in an initial state of the internal combustion engine may become improper. Therefore, it is necessary to correct the threshold value according to a state of vibration occurring in the internal combustion engine so that retard control of the ignition timing is carried out more frequently when it can be said that a frequency of occurrence of knocking is high, for example. Therefore, the threshold value is corrected based on the frequency of occurrence of knocking. In this way, it is possible to correct the threshold value so that the ignition timing is retarded more frequently when it can be said that the frequency of occurrence of knocking is high. Conversely, when it can be said that the frequency of occurrence of knocking is low, it is possible to correct the threshold value so that the ignition timing can be advanced more frequently. However, if the threshold value is corrected to thereby retard the ignition timing in the high-load range, output of the internal combustion engine decreases and necessary output cannot be obtained in some cases. On the other hand, if the threshold value is corrected to advance the ignition timing when the ignition timing is set close to MBT with which torque becomes the maximum in a range in which knocking does not occur or in a low-load range in which there is a low possibility that knocking occurs, knocking becomes more likely to occur. Therefore, when the load of the internal combustion engine is higher than the predetermined load, when the load of the internal combustion engine is lower than the predetermined load, and when a difference between the actual ignition timing and the predetermined ignition timing is smaller than the predetermined value, correction of the threshold value is prohibited. In this way, it is possible to suppress more correction of the threshold value than necessary. Therefore, the ignition timing can be controlled to be timing suitable to an operation state of the internal combustion engine. As a result, it is possible to provide the ignition timing control device of the internal combustion engine for properly controlling the ignition timing.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
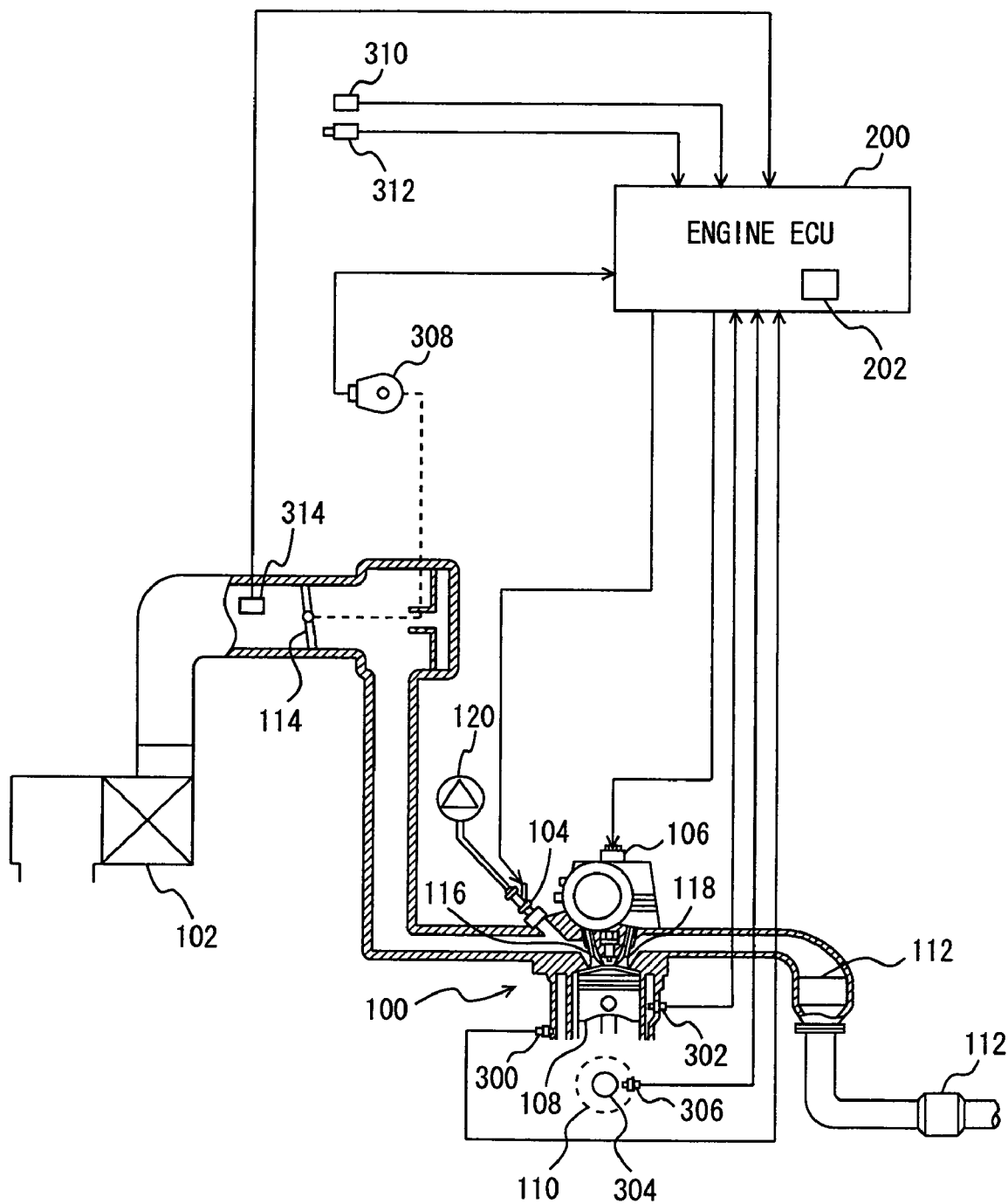
FIG. 1 is a schematic block diagram of an engine controlled by an engine ECU which is an ignition timing control device according to an embodiment of the present invention.

Embodiments of the present invention will be described below with reference to the drawings. In the following description, the same parts are provided with the same reference numerals. They have the same names and functions. Therefore, detailed description of the same parts is not repeated.

With reference to FIG. 1, an engine 100 of a vehicle mounted with an ignition timing control device according to the embodiment of the present invention will be described. The ignition timing control device according to the present invention is accomplished by a program executed by an engine ECU (Electronic Control Unit) 200, for example.

Engine 100 is an internal combustion engine in which an air-fuel mixture of air drawn in from an air cleaner 102 and fuel injected from an injector 104 is ignited by a spark plug 106 and burnt in a combustion chamber. An ignition timing is controlled to be MBT at which output torque becomes the maximum but is retarded or advanced according to an operation state of engine 100 such as occurrence of knocking.

When the air-fuel mixture is burnt, a piston 108 is pushed down by combustion pressure and a crankshaft 110 is rotated. The air-fuel mixture after combustion (exhaust gas) is cleaned by three-way catalysts 112 and exhausted outside a car. An amount of air amount drawn into engine 100 is regulated by a throttle valve 114.

Engine 100 is controlled by engine ECU 200. Connected to engine ECU 200 are a knock sensor 300, a water temperature sensor 302, a crank position sensor 306 provided to face a timing rotor 304, a sensor 308 of an opening position of throttle, a vehicle speed sensor 310, an ignition switch 312, and an air flow meter 314.

Knock sensor 300 is provided to a cylinder block of engine 100. Knock sensor 300 is formed of a piezoelectric element. Knock sensor 300 generates voltage in response to vibration of engine 100. Magnitude of the voltage corresponds to magnitude of the vibration. Knock sensor 300 sends a signal representing voltage to engine ECU 200. Water temperature sensor 302 detects temperature of cooling water in a water jacket of engine 100 and sends a signal representing a detection result to engine ECU 200.

Timing rotor 304 is provided to crankshaft 110 and rotates with crankshaft 110. On an outer periphery of timing rotor 304, a plurality of protrusions are provided at predetermined intervals. Crank position sensor 306 is provided to face the protrusions of the timing rotor 304. When timing rotor 304 rotates, an air gap between the protrusion of timing rotor 304 and crank position sensor 306 changes and, as a result, magnetic flux passing through a coil portion of crank position sensor 306 increases and decreases to generate electromotive force in the coil portion. Crank position sensor 306 sends a signal representing the electromotive force to engine ECU 200. Engine ECU 200 detects a crank angle based on the signal sent from crank position sensor 306.

Sensor 308 of the opening position of throttle detects an opening position of throttle and sends a signal representing a detection result to engine ECU 200. Vehicle speed sensor 310 detects the number of rotations of a wheel (not shown) and sends a signal representing a detection result to engine ECU 200. Engine ECU 200 calculates a vehicle speed based on the number of rotations of the wheel. Ignition switch 312 is turned on by a driver in starting of engine 100. Air flow meter 314 detects the intake air amount into engine 100 and sends a signal representing a detection result to engine ECU 200.

Engine ECU 200 performs computation based on signals sent from the respective sensors and ignition switch 312 and a map and the program stored in memory 202 and controls the devices so as to bring engine 100 into a desired operation state.

In the present embodiment, engine ECU 200 detects a waveform of vibration (hereafter referred to as "vibration waveform") of engine 100 in a knock detection gate (a section between a predetermined first crank angle and a predetermined second crank angle) based on the signal and the crank angle sent from knock sensor 300 and determines whether or not knocking has occurred in engine 100 based on the detected vibration waveform. The knock detection gate in the embodiment is from a top dead center (0°) to 90° in a combustion stroke. The knock detection gate is not limited to it.

Figure 2:
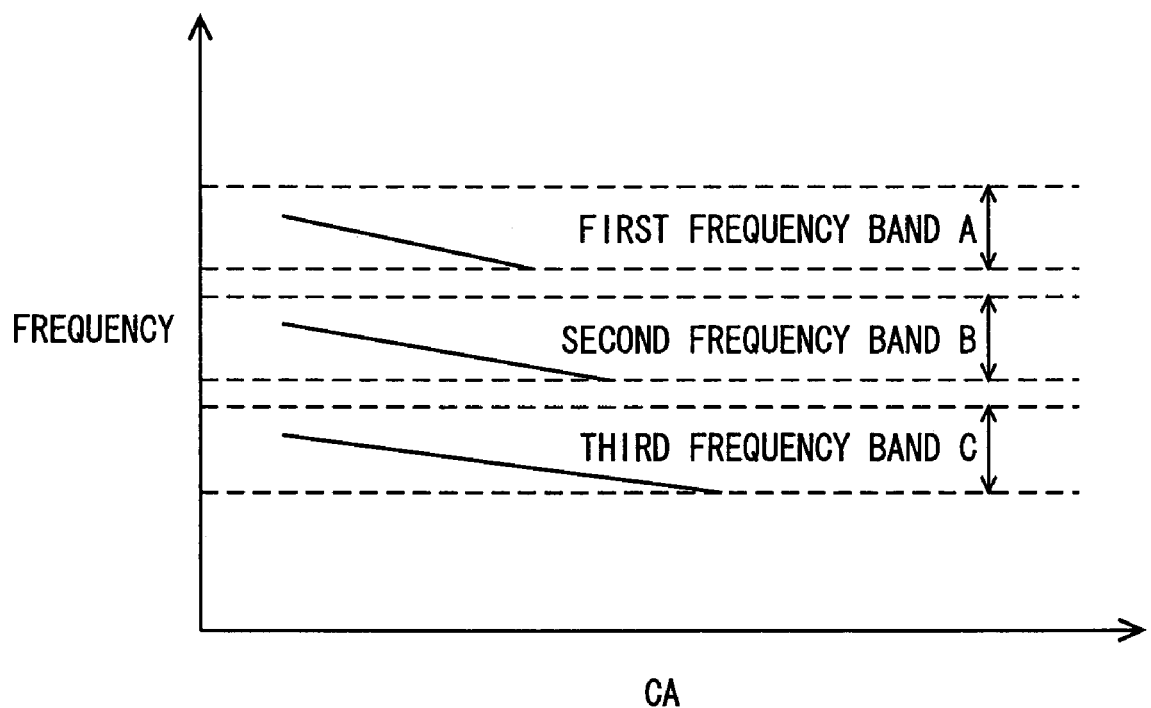
FIG. 2 is a chart showing a frequency band of vibration generated in the engine at the time of knocking.

When knocking occurs, vibration at a frequency near a frequency shown in a solid line in FIG. 2 is generated in engine 100. The frequency of the vibration generated due to the knocking is not constant and varies in a certain range of frequencies. Therefore, in the embodiment, as shown in FIG. 2, vibrations included in a first frequency band A, a second frequency band B, and a third frequency band C, are detected. In FIG. 2, CA designates the crank angle. The number of frequency bands of vibrations generated due to the knocking is not restricted to three.

Figure 3:
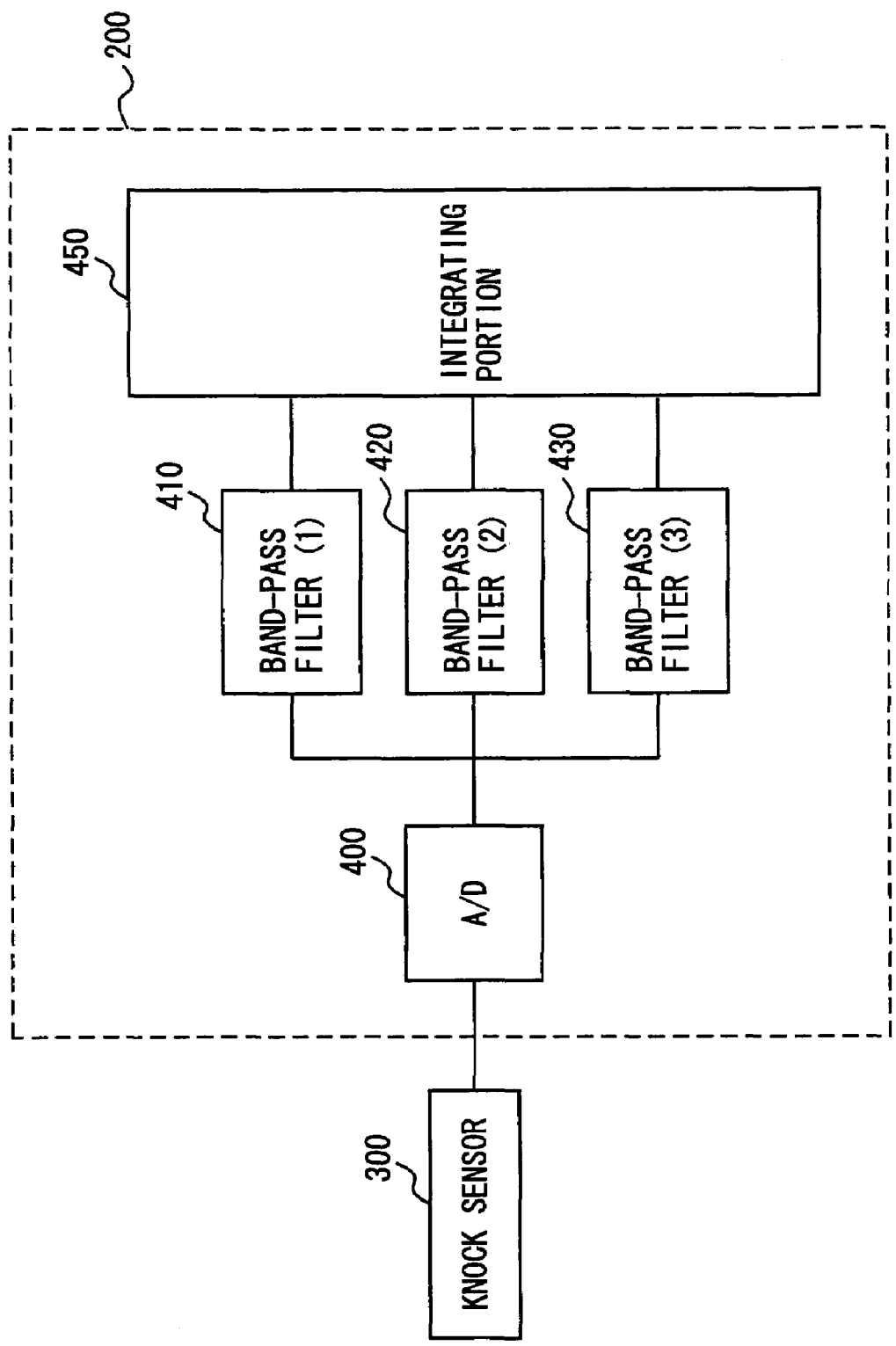
FIG. 3 is a control block diagram showing the engine ECU in FIG. 1.

With reference to FIG. 3, engine ECU 200 will be further described. Engine ECU 200 includes an A/D (analog/digital) converter 400, a band-pass filter (1) 410, a band-pass filter (2) 420, a band-pass filter (3) 430, and an integrating portion 450.

A/D converter 400 converts an analog signal sent from knock sensor 300 into a digital signal. Band-pass filter (1) 410 allows passage of only signals in first frequency band A out of signals sent from knock sensor 300. In other words, by band-pass filter (1) 410, only vibrations in first frequency band A are extracted from vibrations detected by knock sensor 300.

Band-pass filter (2) 420 allows passage of only signals in second frequency band B out of signals sent from knock sensor 300. In other words, by band-pass filter (2) 420, only vibrations in second frequency band B are extracted from vibrations detected by knock sensor 300.

Band-pass filter (3) 430 allows passage of only signals in third frequency band C out of signals sent from knock sensor

300. In other words, by band-pass filter (3) 430, only vibrations in third frequency band C are extracted from vibrations detected by knock sensor 300.

Integrating portion 450 integrates signals selected by the band-pass filters (1) 410 to (3) 430, i.e., magnitudes of vibrations for a crank angle of 5° at a time. The integrated value will hereafter be referred to as an integrated value. The integrated value is calculated in each frequency band. By this calculation of the integrated value, the vibration waveform in each frequency band is detected.

Furthermore, the calculated integrated values in the first to third frequency bands A to C are added to correspond to the crank angles. In other words, the vibration waveforms of the first to third frequency bands A to C are synthesized.

Figure 4:
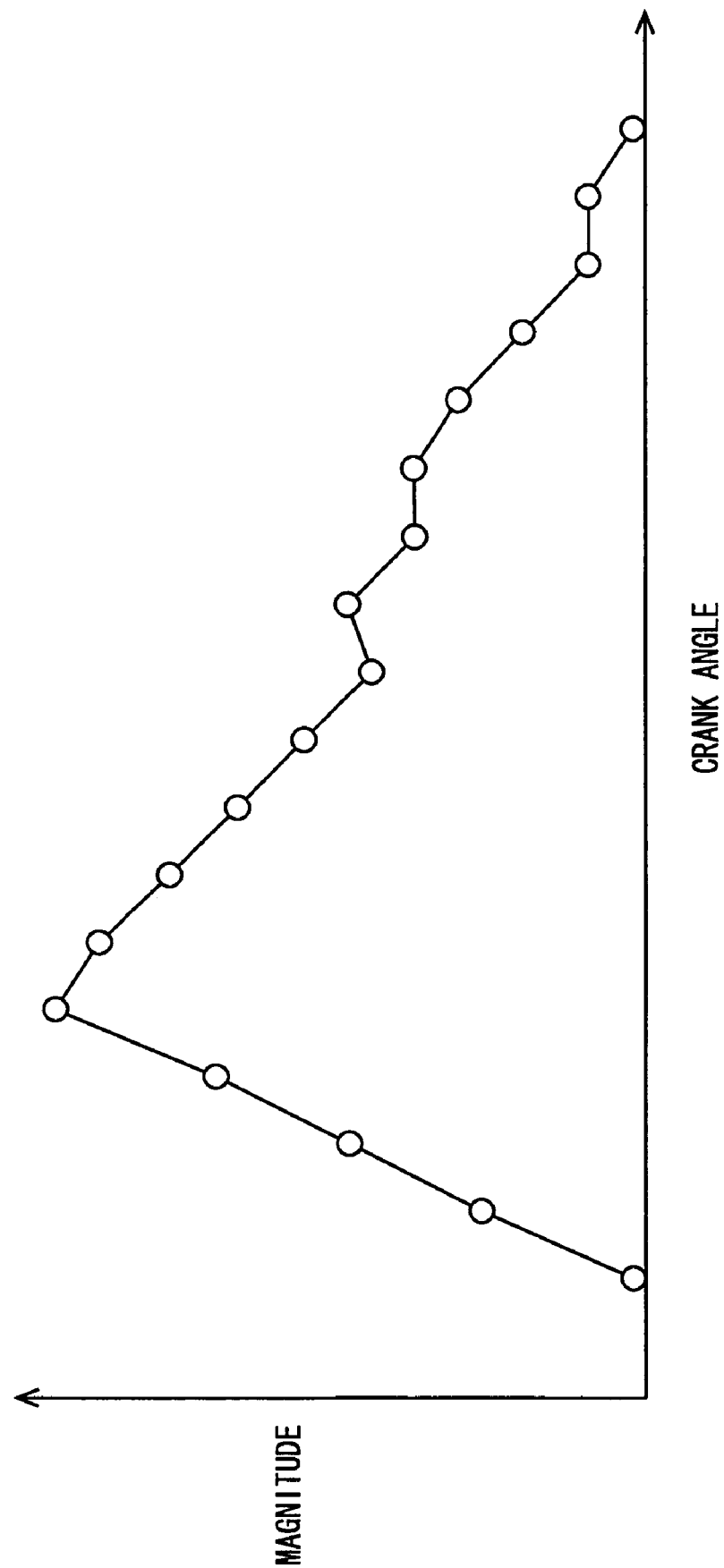
FIG. 4 is a chart showing a waveform of the vibration in the engine.

As a result, as shown in FIG. 4, a vibration waveform of engine 160 is detected. In other words, the synthesized waveform of the first to third frequency bands A to C are used as the vibration waveform of engine 100.

Figure 5:
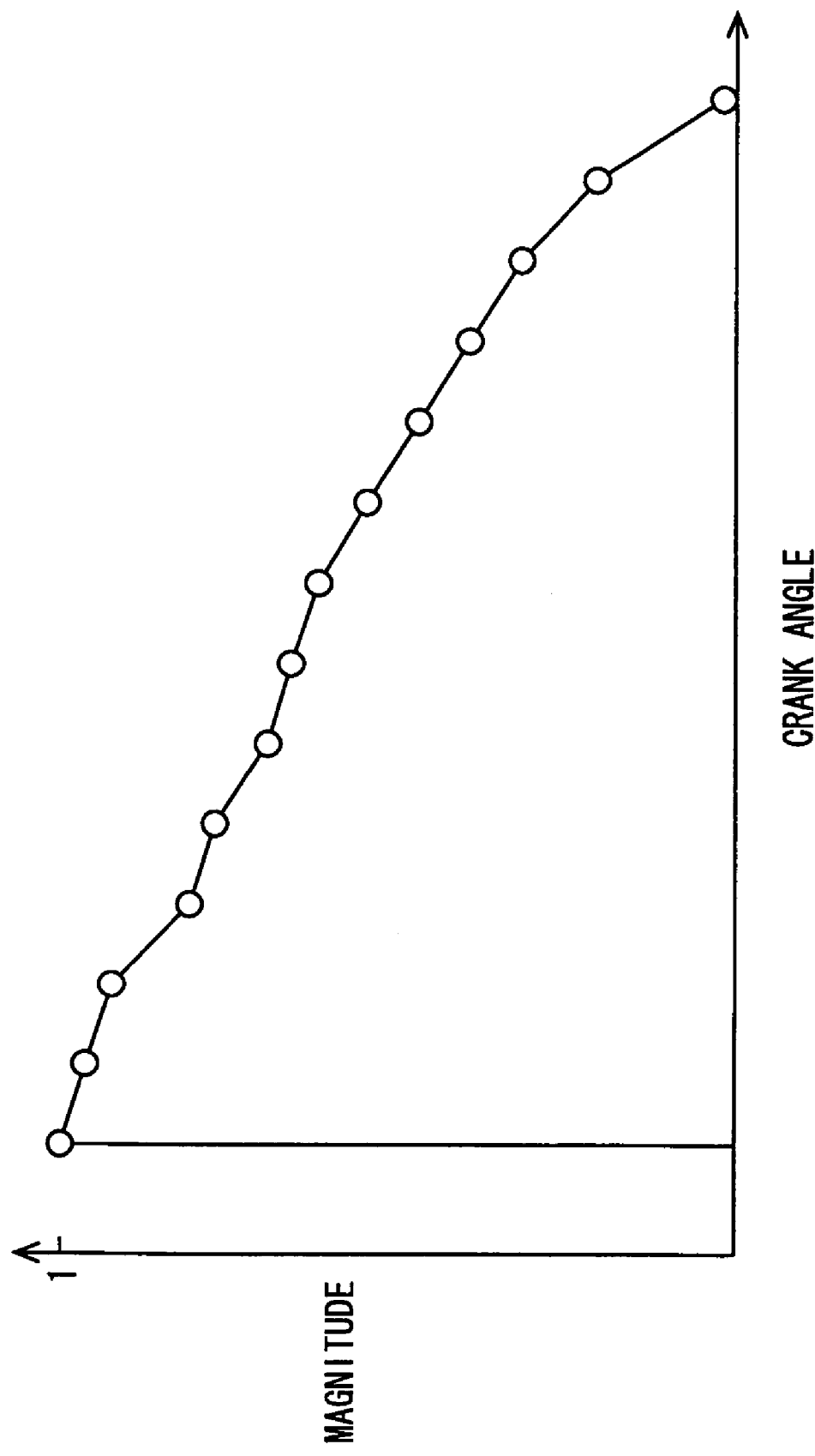
FIG. 5 is a chart showing a knock waveform model stored in memory of the engine ECU.

The detected vibration waveform is compared with a knock waveform model stored in memory 202 of engine ECU 200 as shown in FIG. 5. The knock waveform model is formed in advance as a model of a vibration waveform when the knocking occurs in engine 100.

In the knock waveform model, the magnitudes of the vibrations are expressed as dimensionless numbers in a range of 0 to 1 and the magnitude of the vibration does not univocally correspond to the crank angle. In other words, in the knock waveform model in the embodiment, it is determined that the magnitude of the vibration decreases as the crank angle increases after a peak value of the magnitude of the vibration, but a crank angle at which the magnitude of the vibration becomes the peak value is not determined.

The knock waveform model in the embodiment corresponds to the vibration after the peak value of the magnitude of the vibration generated due to the knocking. It is also possible to store a knock waveform model corresponding to vibration after a rising edge of the vibration caused by the knocking.

The knock waveform model is formed and stored in advance based on a vibration waveform of engine 100 detected when knocking is forcibly generated experimentally.

The knock waveform model is formed by using engine 100 with dimensions of engine 100 and an output value of knock sensor 300 which are median values of dimensional tolerance and tolerance of the output value of knock sensor 300 (hereafter referred to as "median characteristic engine"). In other words, the knock waveform model is a vibration waveform in a case in which the knocking is forcibly generated in the median characteristic engine.

A method of forming the knock waveform model is not limited to it and it is also possible to form the model by simulation. Engine ECU 200 compares the detected waveform and the stored knock waveform model with each other and determines whether or not the knocking has occurred in engine 100.

Figure 6:
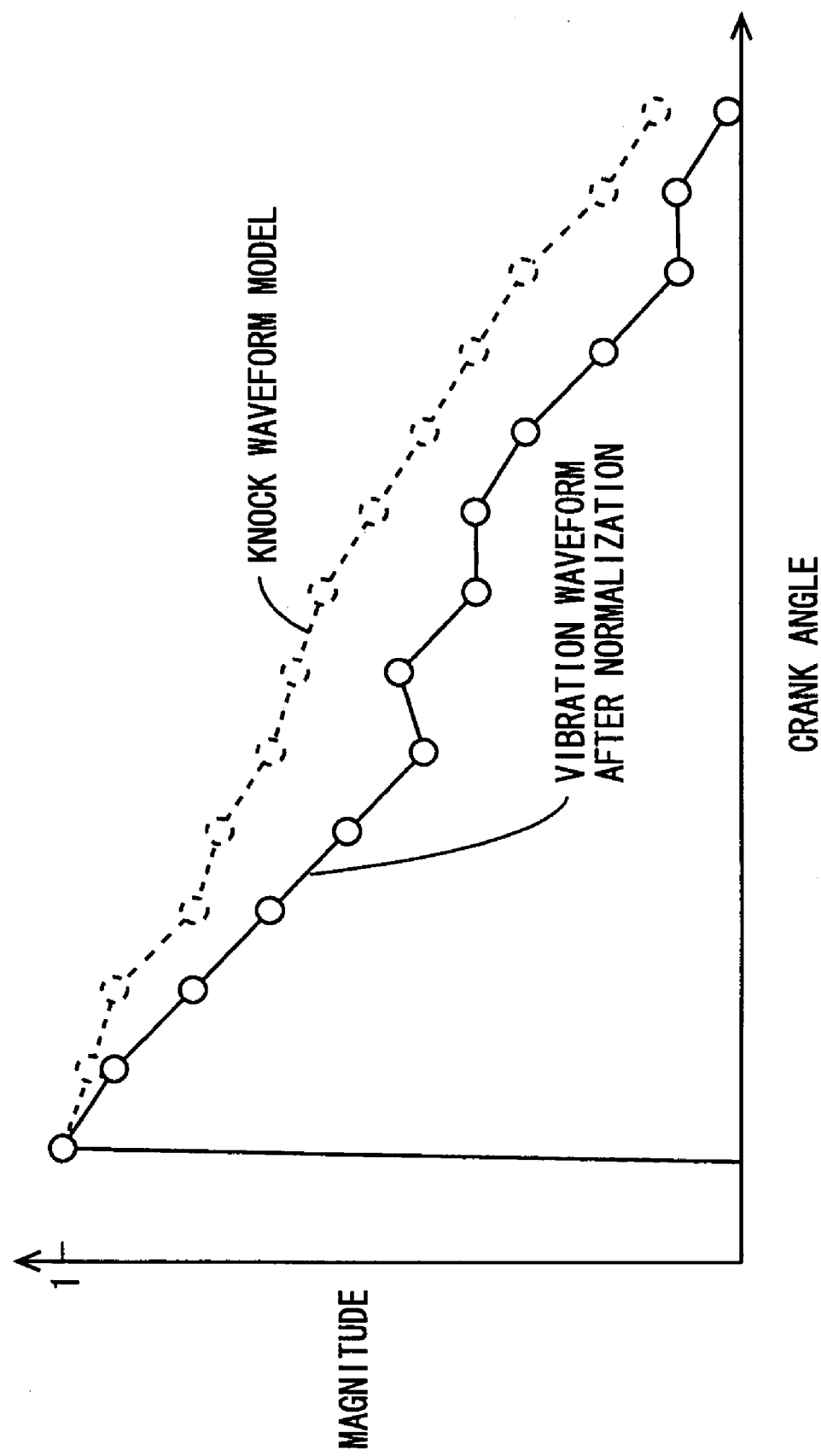
FIG. 6 is a chart for comparing the vibration waveform and the knock waveform model.

In comparison between the detected waveform and the knock waveform model, as shown in FIG. 6, a normalized waveform and the nock waveform model are compared with each other. Here, normalization means to express the magnitude of the vibration as a dimensionless number in a range of 0 to 1 by dividing each integrated value by a maximum value of the integrated value in the detected vibration waveform, for example. However, a method of normalization is not limited to it.

In the embodiment, engine ECU 200 calculates a correlation coefficient K which is a value related to a deviation of the normalized vibration waveform and the knock waveform model from each other. With timing at which the magnitude of the vibration becomes a maximum value in the vibration waveform after the normalization and timing at which the magnitude of the vibration becomes a maximum value in the knock waveform model synchronized, an absolute value (deviation amount) of the deviation of the vibration waveform after the normalization and the knock waveform model from each other is calculated at every 5° of crank angle to thereby calculate correlation coefficient K.

If the absolute value of the deviation of the vibration waveform after the normalization and the knock waveform model from each other at each crank angle is $\Delta S(I)$ (I is a natural number) and a value (an area of the knock waveform model) obtained by integrating the magnitude of the vibration in the knock waveform model by the crank angle is S, correlation coefficient K is calculated by an equation, $K=(S-\Sigma \Delta S(I))/S$, where $\Sigma \Delta S(I)$ is the total of $\Delta S(I)$. In the embodiment, the closer a shape of the vibration waveform to a shape of the knock waveform model, the greater value correlation coefficient K is calculated as. Therefore, if a waveform of vibration caused by factors other than the knocking is included in the vibration waveform, correlation coefficient K is calculated as a small value. A method of calculating correlation coefficient K is not limited to it.

Furthermore, engine ECU 200 calculates a knock magnitude N based on correlation coefficient K and the maximum value (peak value) of the integrated value. If the maximum value of the integrated value is P and a value representing the magnitude of engine 100 when the knocking is not generated in engine 100 is BGL (Back Ground Level), knock magnitude N is calculated by an equation, $N=P \times K/BGL$. BGL is stored in memory 202. A method of calculating knock magnitude N is not limited to it.

Figure 7:
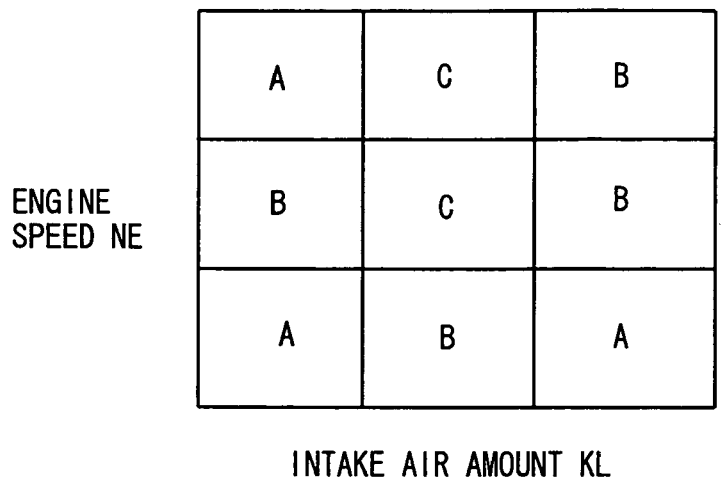
FIG. 7 is a chart showing a map of a determination value V(KX) stored in the memory of the engine ECU.

In the embodiment, engine ECU 200 compares calculated knock magnitude N and a determination value V(KX) stored in memory 202 to thereby determine whether or not knocking has occurred in engine 100 for every ignition cycle. As show in FIG. 7, determination values V(KX) are stored as a map using an engine speed NE and an intake air amount KL as parameters.

As an initial value of determination value V(KX), a value determined in advance by experiment or the like is used. However, a magnitude of the same vibration occurring in engine 100 may be detected as different values due to variation in the output values and degradation of knock sensor 300. In this case, it is necessary to correct determination value V(KX) and to determine whether or not knocking has occurred by using determination value V(KX) corresponding to the magnitude detected actually.

Figure 8:
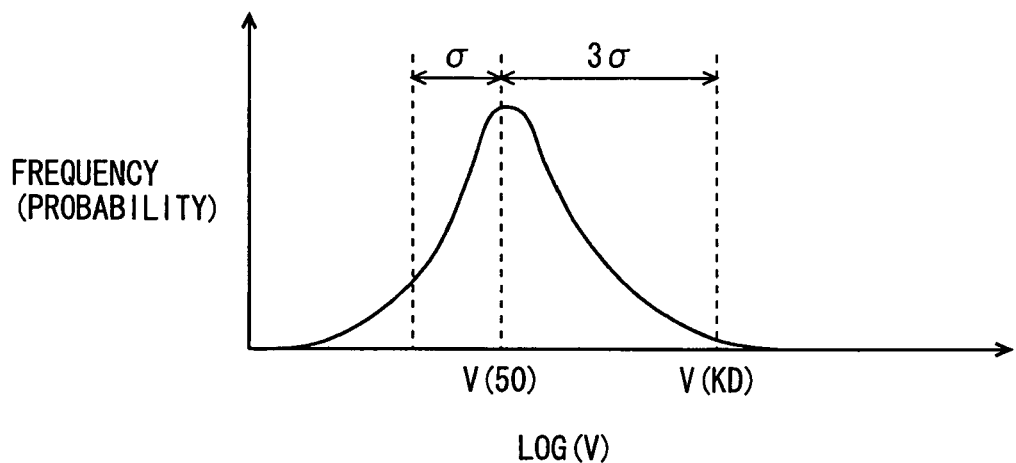
FIG. 8 is a chart (No. 1) showing frequency distribution of magnitude values LOG(V)

Therefore, in the embodiment, as shown in FIG. 8, each determination value V(KX) is corrected by using frequency distribution representing a relationship between a magnitude value LOG(V) which is a value obtained by logarithmically converting magnitudes V for the predetermined number of ignition cycles (e.g., 200 cycles) and a frequency (the number of times, a probability) of detection of each magnitude value LOG(V).

The frequency distribution of magnitude values (LOG) (V) is formed for each range in which engine speed NE and the intake air amount KL are used as parameters and corresponding determination value V(KX) is corrected. Magnitude V used for calculating magnitude value LOG(V) is a peak value (peak value of integrated values at every 5°) of magnitudes between predetermined crank angles.

In the frequency distribution, median value V(50) at which the accumulative sum of frequencies of magnitudes LOG(V) from the minimum value reaches 50% is calculated. Furthermore, standard deviations σ at magnitude values LOG(V) equal to or smaller than median value V(50) are calculated. A value obtained by adding the product of a coefficient U (U is a constant and U=3, for example) and standard deviation σ to median value V(50) is a knock determination level V(KD). A method of calculating knock determination level V(KD) is not limited to it. It is determined that the frequency of magnitude values LOG(V) greater than knock determination level V(KD) is a frequency of occurrence of knocking.

Coefficient U is a coefficient obtained based on data and findings obtained by experiments and the like. Magnitude value LOG(V) greater than knock determination level V(KD) when U=3 substantially agrees with magnitude value LOG(V) in an ignition cycle in which knocking has actually occurred. It is also possible to use other values than "3" as coefficient U.

Figure 9:
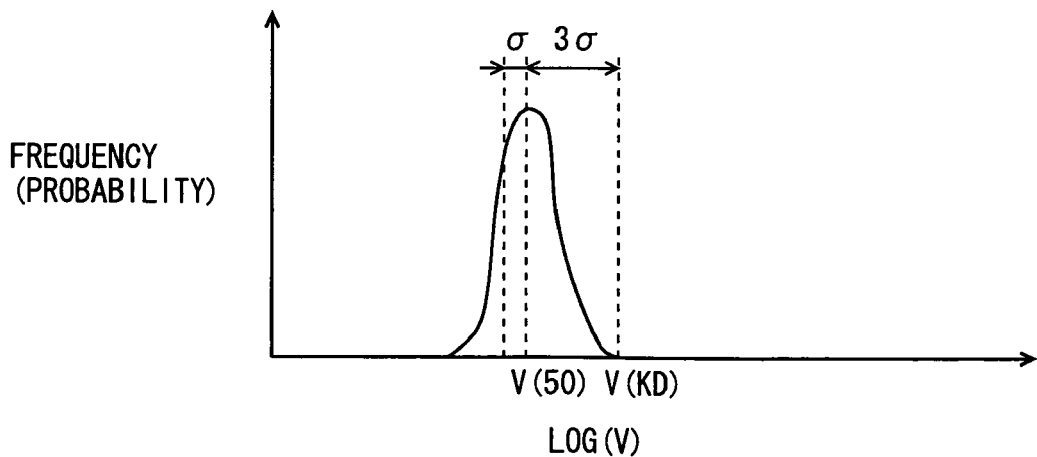
FIG. 9 is a chart (No. 2) showing frequency distribution of magnitude values LOG(V)

In the frequency distribution of magnitude values LOG (V), as shown in FIG. 9, if magnitude values LOG(V) of vibrations which are noise components are mixed in magnitude values LOG(V), a frequency with which large magnitude values LOG(V) are calculated becomes high and the frequency distribution becomes biased in shape. In this case, a range of distribution (a difference between the minimum value and the maximum value) of magnitude values LOG (V) may become narrow and magnitude values LOG(V) greater than knock determination level V(KD) may become extremely few in some cases. As a result, there is a fear that the number of times that knocking has occurred cannot be determined accurately.

Figure 10:
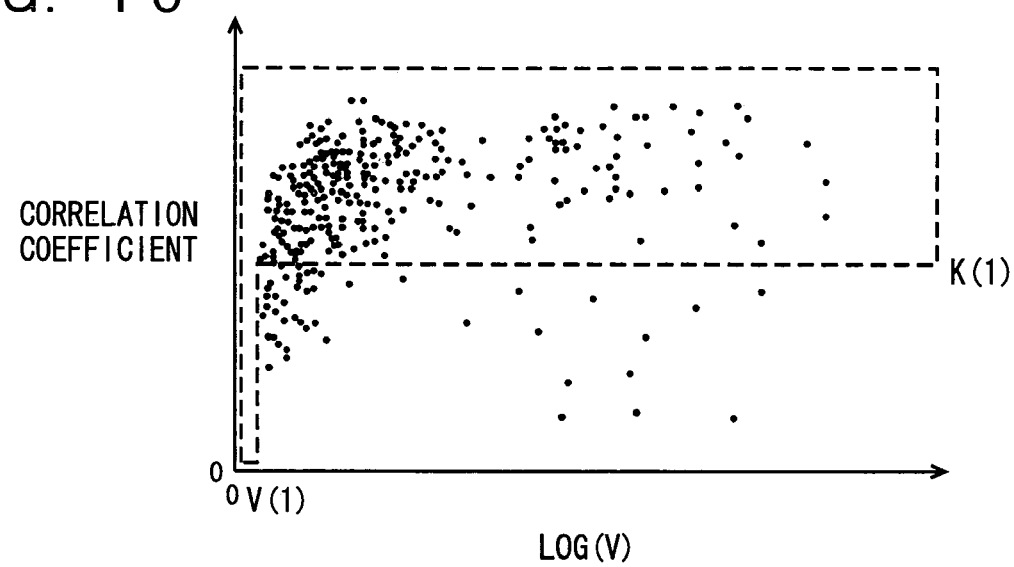
FIG. 10 is a chart showing magnitude values LOG(V) used for forming the frequency distribution of the magnitude values LOG(V)

Therefore, in the embodiment, as magnitude values LOG (V) used for forming the frequency distribution, magnitude values LOG(V) in a range surrounded with a broken line in FIG. 10 are used. FIG. 10 is a chart in which calculated magnitude values LOG(V) are plotted for each correlation coefficient K in a cycle in which magnitude values LOG(V) are obtained.

As shown in FIG. 10, the frequency distribution is formed after excluding magnitude values LOG(V) greater than a threshold value V(1) and calculated in ignition cycles in which correlation coefficient K is smaller than a threshold value K(1). In other words, magnitude values LOG(V) satisfying a condition that they are smaller than threshold value V(1) and magnitude values LOG(V) calculated in the ignition cycles in which correlation coefficients K satisfying a condition that they are greater than threshold value K(1) are extracted to form the frequency distribution.

Figure 11:
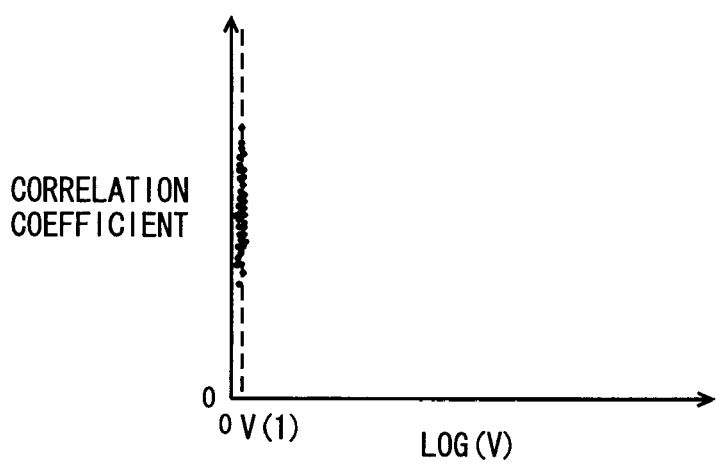
FIG. 11 is a chart showing magnitude values LOG(V) in setting a threshold value V(1)

With reference to FIG. 11, threshold value V(1) will be further described. FIG. 11 shows magnitude values LOG(V) when engine 100 is operated so that magnitudes V of vibrations due to factors (noise components) other than knocking are not taken in when magnitudes V used for calculating magnitude values LOG(V) are detected.

As the vibrations due to the noise components, vibrations due to piston slap, vibrations due to actuation of an injector 104 (and especially a direct injector), vibrations due to seating of an intake valve 116 or an exhaust valve 118, and the like are conceivable.

In the gate (between predetermined crank angles) for taking in magnitudes V, engine 100 is operated so that the piston slap does not occur and engine 100 is operated so that injector 104, intake valve 116, and exhaust valve 118 are stopped to thereby calculate magnitude values LOG(V) shown in FIG. 11.

A median value of magnitude values LOG(V) calculated in this manner is set as threshold value V(1). The median value is set as threshold value V(1) because magnitude values of the vibrations due to the noise components are considered to be greater than the median value. It is also possible to set a value (e.g., a value smaller than the median value) other than the median value as threshold value V(1).

Figure 12:
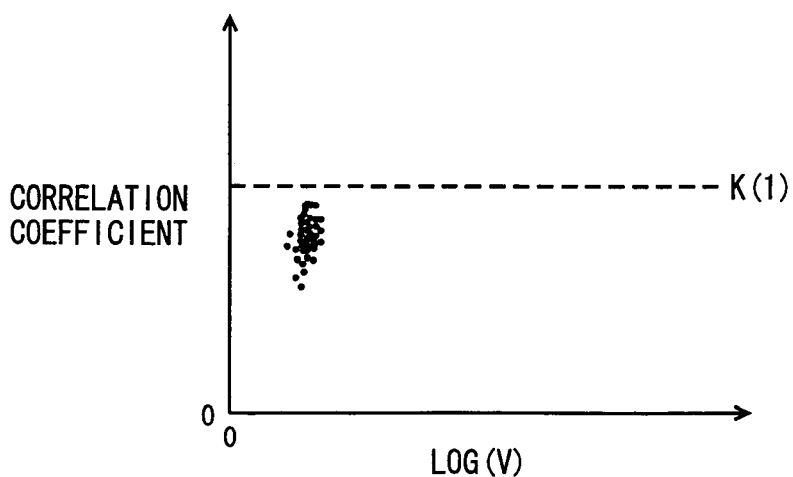
FIG. 12 is a chart showing magnitude values LOG(V) in setting a threshold value K(1)

With reference to FIG. 12, threshold value K(1) will be further described. FIG. 12 shows magnitude values LOG(V) when engine 100 is operated so that a noise waveform is included in vibration waveform in the ignition cycle in which magnitude values LOG(V) are calculated.

In the knock detection gate, engine 100 is operated so that the piston slap occurs and engine 100 is operated so that injector 104, intake valve 116, and exhaust valve 118 are actuated to thereby calculate magnitude values LOG(V) shown in FIG. 12.

A maximum value of correlation coefficients K in magnitude values LOG(V) calculated in this manner is set as threshold value K(1). It is also possible to set a value (e.g., a value greater than the maximum value) other than the maximum value as threshold value K(1).

Thus, by using magnitude values LOG(V) smaller than threshold value V(1) and magnitude values LOG(V) in the ignition cycle in which correlation coefficient K is greater than threshold value K(1), the frequency distribution is formed. In other words, while excluding magnitude values LOG(V) which are considered to be magnitude values LOG(V) of the vibrations of the noise components, the frequency distribution is formed.

Figure 13:
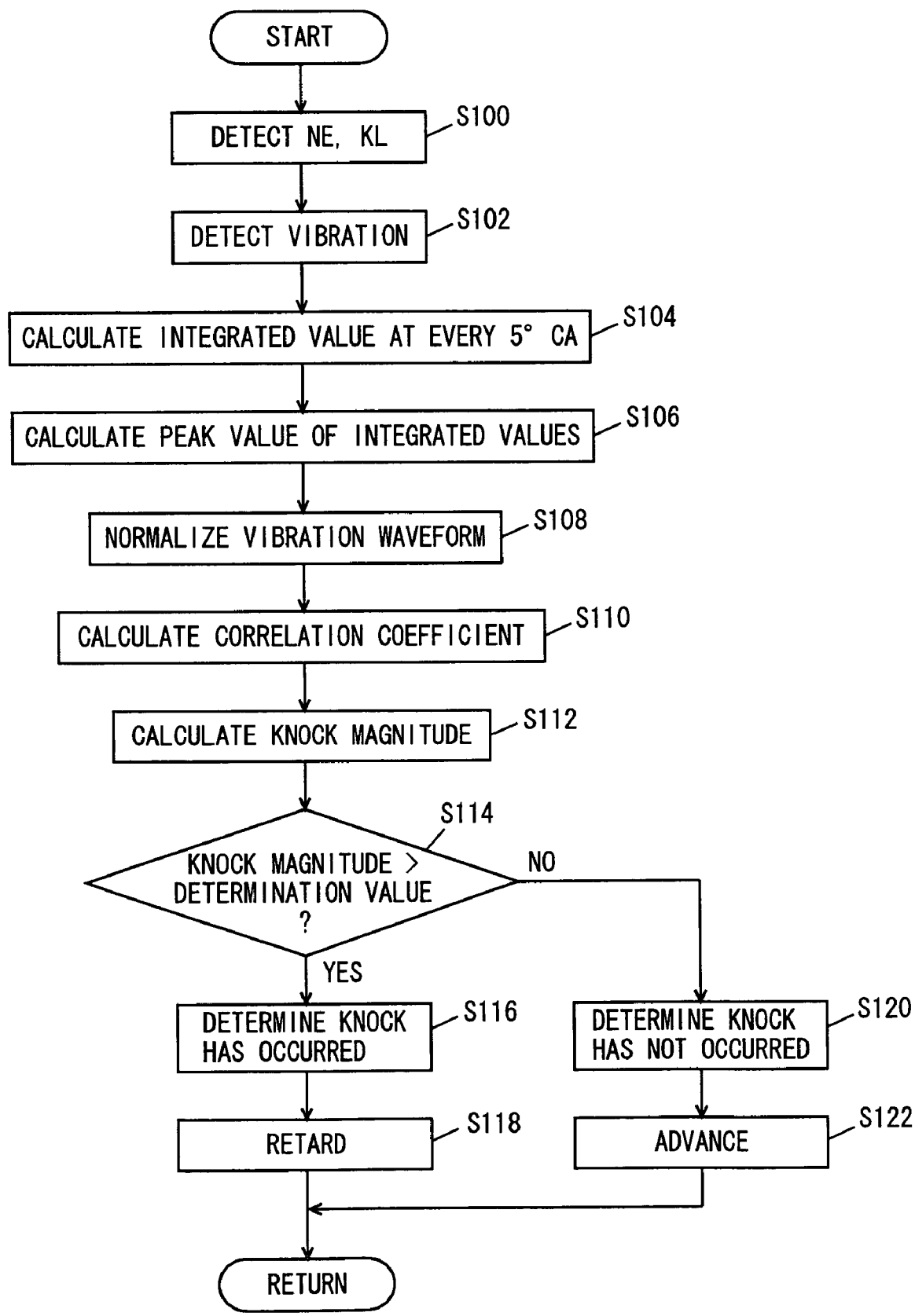
FIG. 13 is a flowchart (No. 1) showing a control structure of the program executed by the engine ECU in FIG. 1.

With reference to FIG. 13, a control structure of a program executed by engine ECU 200 which is the ignition timing control device according to the embodiment so as to control the ignition timing by determining whether or not knocking has occurred in each ignition cycle will be described.

In step 100 (hereafter "step" will be abbreviated to "S"), engine ECU 200 detects engine speed NE based on a signal sent from crank position sensor 306 and detects intake air amount KL based on a signal sent from air flow meter 314.

In S102, engine ECU 200 detects magnitude of vibration of engine 100 based on a signal sent from knock sensor 300. The magnitude of the vibration is expressed as an output voltage of knock sensor 300. The magnitude of the vibration may be expressed as a value corresponding to the output voltage of knock sensor 300. Detection of the magnitude is carried out between the top dead center and 90° (a crank angle of 90°) in a combustion stroke.

In S104, engine ECU 200 calculates a value (integrated value) obtained by integrating output voltages (values representing magnitudes of vibrations) of knock sensor 300 for every 5° (for 5°) of crank angle. The integrated value is calculated for vibrations in each of first to third frequency bands A to C. Moreover, integrated values in the first to third frequency bands A to C are added to correspond to the crank angles to thereby detect a vibration waveform of engine 100.

In S106, engine ECU 200 calculates the largest integrated value (peak value) out of integrated values in a synthesized waveform (vibration waveform of engine 100) of the first to third frequency bands A to C.

In S108, engine ECU 200 normalizes the vibration waveform of engine 100. Here, normalization means to express the magnitude of the vibration as a dimensionless number in a range of 0 to 1 by dividing each integrated value by the calculated peak value.

In S110, engine ECU 200 calculates correlation coefficient K which is a value related to the deviation of the normalized vibration waveform and the knock waveform model from each other.

In S112, engine ECU 200 calculates the knock magnitude N. If the calculated peak value is P and a value representing the magnitude of the vibration of engine 100 when the knocking is not generated in engine 100 is BGL (Back Ground Level), knock magnitude N is calculated by an equation, N=P×K/BGL. BGL is stored in memory 202. A method of calculating knock magnitude N is not limited to it.

In S114, engine ECU 200 determines whether or not knock magnitude N is greater than the predetermined determination value. If knock magnitude N is greater than the predetermined determination value (YES in S114), the processing moves to S116. Otherwise (NO in S114), the processing moves to S120.

In S116, engine ECU 200 determines that knocking has occurred in engine 100. In S118, engine ECU 200 retards the ignition timing. In S120, engine ECU 200 determines that knocking has not occurred in engine 100. In S122, engine ECU 200 advances the ignition timing.

Figure 14:
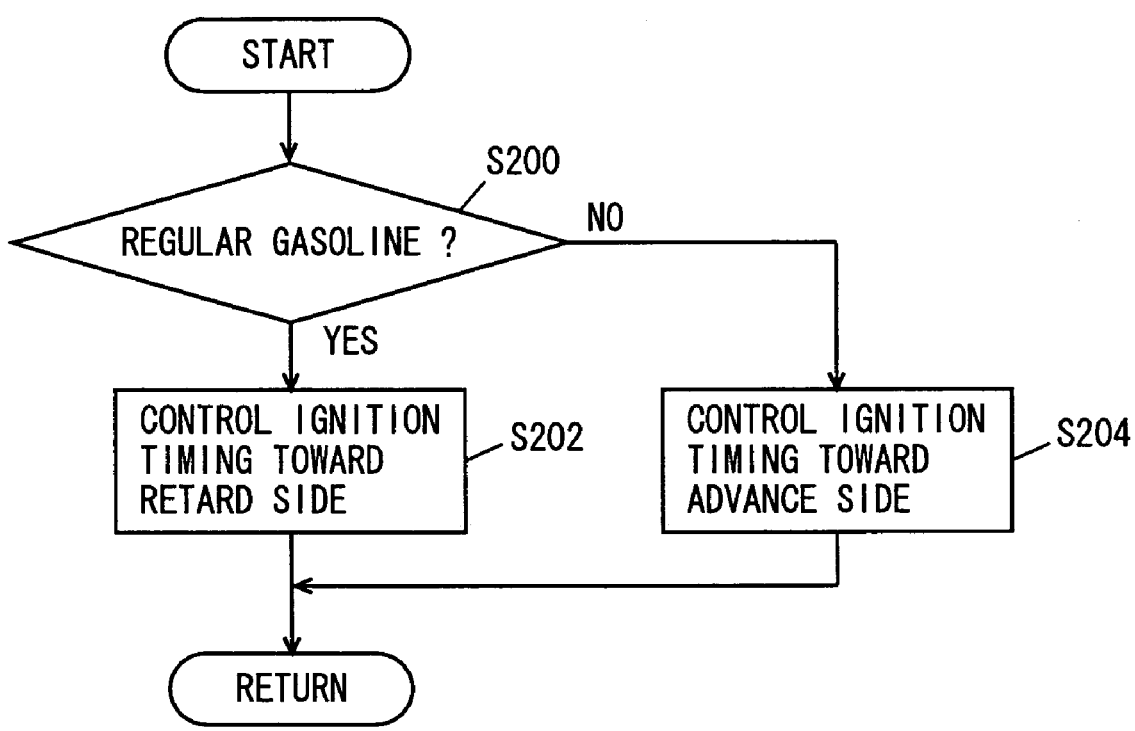
FIG. 14 is a flowchart (No. 2) showing the control structure of the program executed by the engine ECU in FIG. 1.

With reference to FIG. 14, a control structure of a program executed by engine ECU 200 which is the ignition timing control device according to the embodiment so as to control the ignition timing according to a type of fuel used for engine 100 will be described.

In S200, engine ECU 200 determines whether the fuel used for engine 10 is regular gasoline or premium gasoline. Whether the regular gasoline or the premium gasoline is determined based on a retard amount of the ignition timing, for example. If the retard amount is greater than a predetermined crank angle, it is determined that the fuel used for engine 100 is the regular gasoline. Otherwise, it is determined that the fuel is the premium gasoline. A method of determining whether the fuel is the regular gasoline or the premium gasoline is not limited to it. It is also possible to utilize other general known techniques.

If the fuel used for engine 100 is the regular gasoline (YES in S200), the processing moves to S202. Otherwise (NO in S200), the processing moves to S204.

In S202, engine ECU 200 controls the ignition timing toward a retard side. At this time, engine ECU 200 controls the ignition timing by selecting a map in which a maximum advance amount, a maximum retard amount, and MBT of the ignition timing and a basic ignition timing are set on a retard side as compared with those when the premium gasoline is used. A method of controlling the ignition timing toward the retard side is not limited to it. It is also possible to utilize other general known techniques.

In S204, engine ECU 200 controls the ignition timing toward an advance side. At this time, engine ECU 200 controls the ignition timing by selecting a map in which a maximum advance amount, a maximum retard amount, and MBT of the ignition timing and a basic ignition timing are set on an advance side as compared with those when the regular gasoline is used. A method of controlling the ignition timing toward the advance side is not limited to it. It is also possible to utilize other general known techniques.

Figure 15:
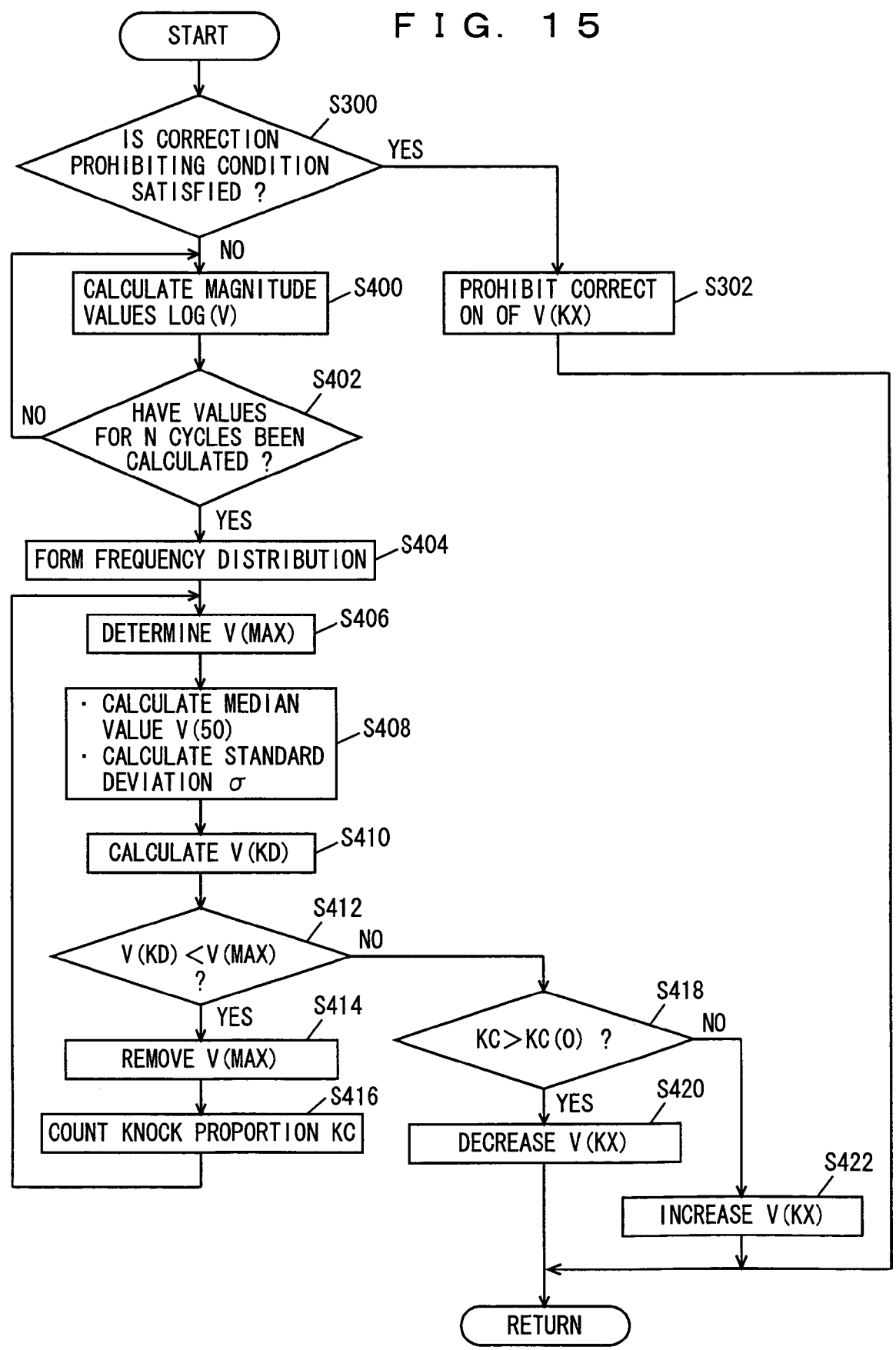
FIG. 15 is a flowchart (No. 3) showing the control structure of the program executed by the engine ECU in FIG. 1.

With reference to FIG. 15, a control structure of a program executed by engine ECU 200 which is the ignition timing control device according to the embodiment so as to correct determination value V(KX) will be described.

In S300, engine ECU 200 determines whether or not a correction prohibiting condition of determination value V(KX) is satisfied. Engine ECU 200 determines that the correction prohibiting condition of determination value V(KX) is satisfied when engine 100 is operated in a higher range of a load of engine 100 than a predetermined load or when a difference between the ignition timing of engine 100 and MBT is smaller than a predetermined value. The correction prohibiting condition is not limited to it and it is also possible to determine that the correction prohibiting condition of determination value V(KX) is satisfied when engine 100 is operated in a lower range of the load of engine 100 than a predetermined load.

When the correction prohibiting condition of determination value V(KX) is satisfied (YES in S300), the processing moves to S302. Otherwise (NO in S300), the processing moves to S400.

In S302, engine ECU 200 prohibits correction of determination value V(KX). At this time, engine ECU 200 does not prohibit performance of the ignition timing control according to the type of fuel used for engine 100. In other words, even when engine ECU 200 prohibits the correction of the determination value V(KX), engine ECU 200 controls the ignition timing toward the retard side when the regular gasoline is used and controls the ignition timing toward the advance side when the premium gasoline is used.

In S400, engine ECU 200 calculates magnitude value LOG(V) from magnitude V detected based on the signal sent from knock sensor 300. Here, magnitude V is a peak value (peak value of integrated values at every 5°) between predetermined crank angles.

In S402, engine ECU 200 determines whether or not magnitude values LOG(V) for N cycles (N is a natural number and N=200, for example) have been calculated. Engine ECU 200 determines that magnitude values LOG(V) for N cycles have been calculated when N or more magnitude values LOG(V) in the above-described range surrounded with a broken line in FIG. 10 have been calculated. If magnitude values LOG(V) for N cycles are calculated (YES in S402), the processing moves to S404. Otherwise (NO in S402), the processing returns to S400.

In S404, engine ECU 200 forms frequency distribution of magnitude values LOG(V). In S406, engine ECU 200 determines a maximum value V(MAX) of magnitude values LOG(V).

In S408, engine ECU 200 calculates a median value V(50) and a standard deviation σ of magnitude values LOG(V) equal to or smaller than maximum value V(MAX). In S410, engine ECU 200 calculates knock determination level V(KD) based on median value V(50) and standard deviation σ.

In S412, engine ECU 200 determines whether or not knock determination level V(KD) is smaller than maximum value V(MAX). If knock determination level V(KD) is smaller than maximum value V(MAX) (YES in S412), the processing moves to S414. Otherwise (NO in S412), the processing moves to S418.

In S414, engine ECU 200 removes V(MAX) determined in S406 from the frequency distribution. In S416, engine ECU 200 counts the sum of the frequency of the removed maximum values V(MAX) as knock proportion KC. Then, the processing returns to S406.

In S418, engine ECU 200 determines whether or not knock proportion KC is greater than a threshold value KC(0). If knock proportion KC is greater than threshold value KC(0) (YES in S418), the processing moves to S420. Otherwise (NO in S418), the processing moves to S422. In S420, engine ECU 200 decreases determination value V(KX). In S422, engine ECU 200 increases determination value V(KX).

Operation of engine ECU 200 which is the ignition timing control device according to the embodiment based on the above configuration and flowcharts will be described.

When a driver turns ignition switch 312 on to start engine 100, engine speed NE is detected based on the signal sent from crank position sensor 306 and intake air amount KL is detected based on the signal sent from air flow meter 314 (S100). Moreover, based on the signal sent from knock sensor 300, a magnitude of vibration of engine 100 is detected (S102).

Between the top dead center and 90° in the combustion stroke, the integrated value for every 5° of vibrations in each of the first to third frequency bands A to C is calculated (S104). The calculated integrated values in the first to third frequency bands A to C are added to correspond to the crank angles to thereby detect the above-described vibration waveform of engine 100 as shown in FIG. 4.

As an integrated value for every fire degrees is used to detect a vibration waveform, it becomes possible to detect a vibration waveform of which delicate variations are suppressed. Therefore, it becomes easy to compare the detected vibration waveform and the knock waveform model with each other.

Based on the calculated integrated values, peak value P of the integrated values in the synthesized waveform (vibration waveform of engine 100) of the first to third frequency bands A to C is calculated (S106).

The integrated value in the vibration waveform of engine 100 is divided by the calculated peak value P to thereby normalize the vibration waveform (S108). By normalization, the magnitudes of the vibrations in the vibration waveform are expressed as dimensionless numbers in a range of 0 to 1. In this manner, it is possible to compare the detected vibration waveform and the nock waveform model with each other irrespective of the magnitude of the vibration. Therefore, it is unnecessary to store the large number of knock waveform models corresponding to the magnitudes of the vibrations to thereby facilitate forming of the knock waveform model.

With timing at which the magnitude of the vibration becomes a maximum value in the vibration waveform after the normalization and timing at which the magnitude of the vibration becomes a maximum value in the knock waveform model synchronized (see FIG. 6), an absolute value $\Delta S(I)$ of the deviation of the vibration waveform after the normalization and the knock waveform model from each other at each crank angle is calculated. Based on the total of $\Delta S(I)$ and value S obtained by integrating the magnitude of the vibration in the knock waveform model by the crank angle, correlation coefficient K is calculated by $K=(S-\Sigma\Delta S(I))/S$ (S110). In this manner, it is possible to convert a degree of agreement between the detected vibration waveform and the knock waveform model into a number to objectively determine the degree. Furthermore, by comparing the vibration waveform and the knock waveform model with each other, it is possible to analyze whether or not the vibration is a vibration at the time of knocking from behavior of the vibration such as an attenuating trend of the vibration.

By dividing the product of correlation coefficient K calculated as described above and peak value P by BGL, knock magnitude N is calculated (S112). In this manner, it is possible to more closely analyze whether or not the vibration of engine 100 is a vibration caused by knocking based on the magnitude of the vibration in addition to the degree of agreement between the detected vibration waveform and the knock waveform model.

When knock magnitude N is greater than the predetermined determination value (YES in S114), it is determined that knocking has occurred (S116) and the ignition timing is retarded (S118). As a result, occurrence of knocking is suppressed.

On the other hand, when knock magnitude N is not greater than the predetermined determination value (NO in S114), it is determined that knocking has not occurred (S120) and the ignition timing is advanced (S122).

In this way, by comparing knock magnitude N and determination value V(KX) with each other, it is determined whether or not knocking has occurred in each ignition cycle and the ignition timing is retarded or advanced.

At this time, if the knocking does not disappear soon after retarding the ignition timing and the retard amount is greater than the predetermined crank angle, it can be said that low-octane regular gasoline is used as fuel of engine 100 (YES in S200). In this case, the map in which the ignition timing is set on the retard side is selected to control the ignition timing toward the retard side (S202). As a result, occurrence of the knocking is suppressed.

On the other hand, if the knocking has disappeared when the retard amount is smaller than the predetermined crank angle, it can be said that high-octane premium gasoline is used as fuel of engine 100 (NO in S200). In this case, the map in which the ignition timing is set on the advance side is selected to control the ignition timing toward the advance side (S204). As a result, reduction in output of engine 100 can be suppressed.

As described above, even when the same vibrations occur in engine 100, detected magnitudes may be different due to variation in and degradation of the output value of knock sensor 300. In this case, it is necessary to correct determination value V(KX) and to determine whether or not knocking has occurred by using determination value V(KX) corresponding to the actually-detected magnitude.

However, even if determination value V(KX) is corrected in every operation range of engine 100, it is not necessarily possible to properly correct the determination value V(KX). For example, as shown in FIG. 16, the smaller the intake air amount KL (i.e., the smaller the load of engine 100), the larger the advance amount at which the knocking starts to occur becomes and the less likely the knocking becomes to occur.

Figure 17:
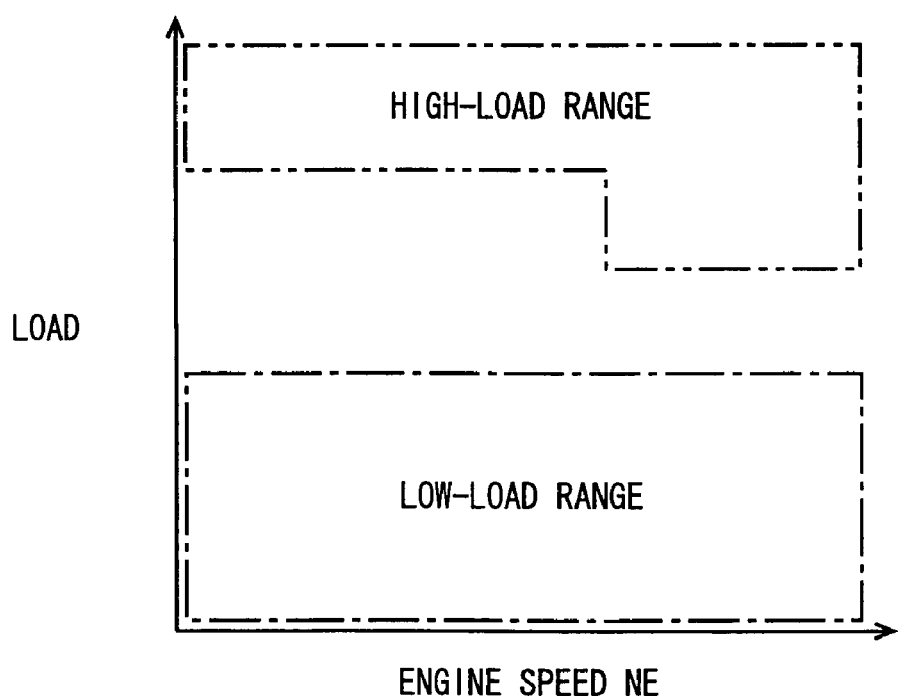
FIG. 17 is a chart showing a load range in which correction of a determination value V(KX) is prohibited.

Especially in a range in which intake air amount KL is equal to or smaller than KL(0), MBT is smaller (on the retard side) than the advance amount at which the knocking starts to occur. Therefore, a possibility that the knocking occurs is extremely low in a low-load range (a range surrounded with an alternate long and short dash line in FIG. 17) in which the ignition timing is close to MBT.

By correcting determination value V(KX) to increase it in such a low-load range, a frequency of determination that the knocking has not occurred increases. Then, if the ignition timing is advanced, the knocking becomes more likely to occur in a range in which the knocking is inherently unlikely to occur.

Figure 16:
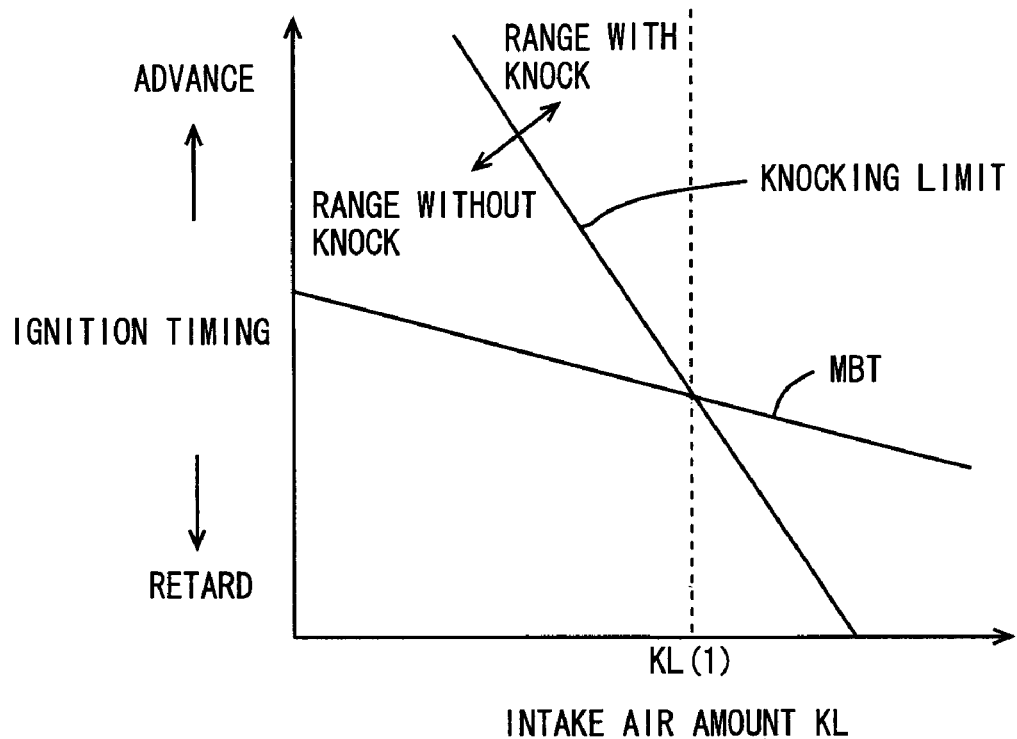
FIG. 16 is a chart showing a relationship between an advance angle at which knocking starts to occur and MBT.

As shown in FIG. 16 described above, the larger the intake air amount KL, the smaller the advance amount at which the knocking starts to occur. Therefore, in a high-load range (a range surrounded with a chain double-dashed line in FIG. 17), the knocking is likely to occur.

However, in the high-load range, traveling sound of the vehicle and driving sound of engine 100 are large and therefore an influence of unusual sound caused by knocking on drivability is small. By correcting determination value V(KX) to decrease it in such a high-load range, a frequency of determination that the knocking has occurred increases. Then, if the ignition timing is retarded, output of engine 100 may decrease more than necessary. In other words, in the high-load range, there are more demerits in retarding the ignition timing for suppressing the knocking than merits in suppressing the knocking.

Therefore, when correction prohibiting condition of determination value V(KX) that engine 100 is operated in the higher range of the load of engine 100 than the predetermined load or that the difference between the ignition timing of engine 100 and MBT is smaller than the predetermined value is satisfied (YES in S300), correction of determination value V(KX) is prohibited (S302).

On the other hand, when the correction prohibiting condition of the determination value V(KX) is not satisfied (NO in S300), magnitude value LOG(V) is calculated from magnitude detected based on the signal sent from knock sensor 300 (S400).

If magnitude values LOG(V) for N cycles have been calculated (YES in S402), frequency distribution of calculated magnitude values LOG(V) is formed (S404) and a maximum value V(MAX) of magnitude values LOG(V) in frequency distribution is determined (S406). Moreover, median value V(50) and standard deviation σ of magnitude values LOG(V) equal to or smaller than maximum value V(MAX) in frequency distribution are calculated (S408) and knock determination level V(KD) is calculated based on median value V(50) and standard deviation a (S410).

Figure 18:
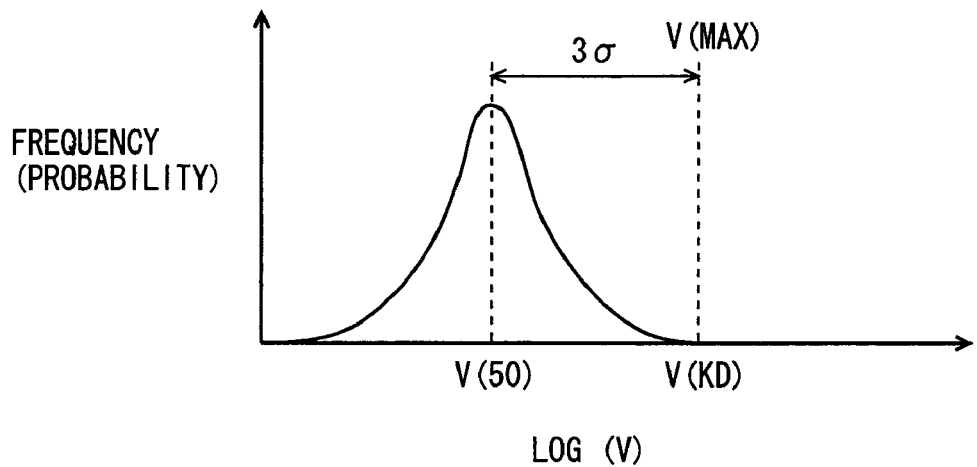
FIG. 18 is a chart (No. 3) showing frequency distribution of magnitude values LOG(V)
Figure 19:
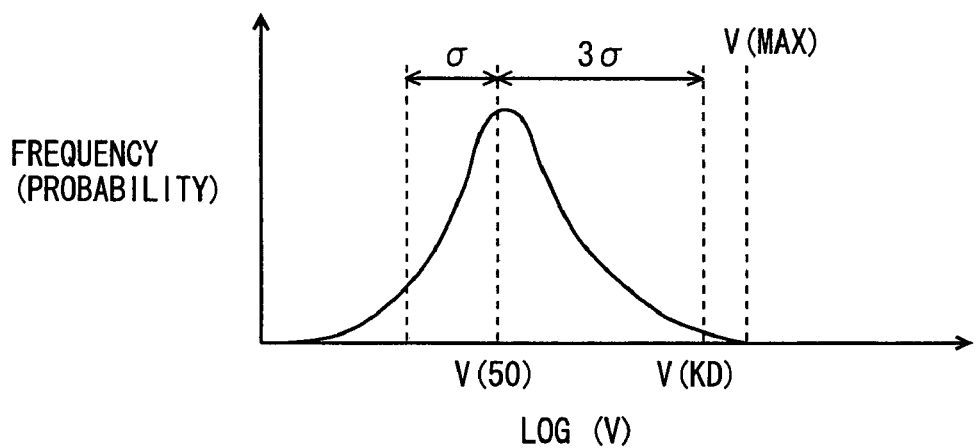
FIG. 19 is a chart (No. 4) showing frequency distribution of magnitude values LOG(V)

When knocking is not generated in engine 100, frequency distribution becomes normal distribution as shown in FIG. 18 and maximum value V(MAX) and knock determination level V(KD) agree with each other. On the other hand, if the great magnitude V is detected due to occurrence of knocking and detection of the large magnitude value LOG(V), maximum value V(MAX) becomes greater than knock determination level V(KD) as shown in FIG. 19.

Figure 20:
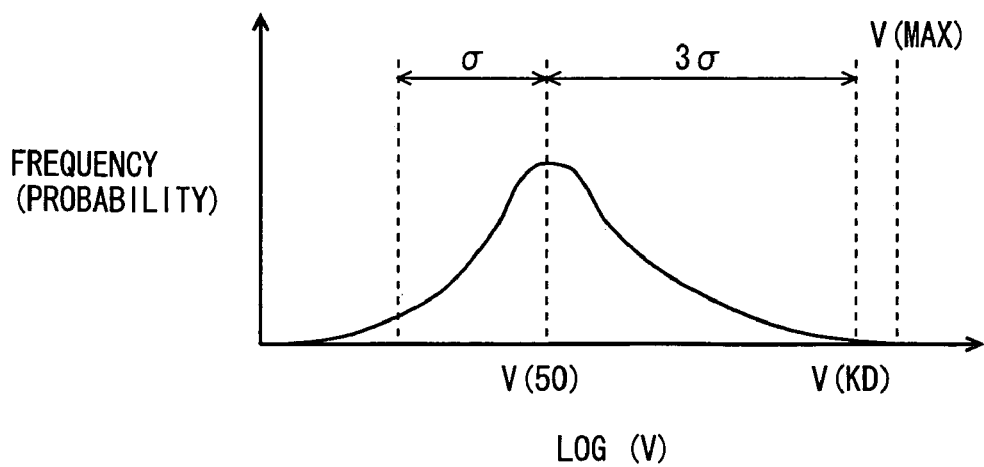
FIG. 20 is a chart (No. 5) showing frequency distribution of magnitude values LOG(V)

Furthermore, when frequency of occurrence of knocking becomes high or when mechanical vibration of engine 100 itself becomes large, maximum value V(X) becomes larger as shown in FIG. 20. At this time, median value V(50) and standard deviation σ in frequency distribution increase with maximum value V(MAX). Therefore, knock determination level V(KD) becomes large.

Because it is not determined that magnitude values LOG(V) smaller than knock determination level V(KD) are magnitude values LOG(V) in the cycle in which knocking has occurred, the larger the knock determination level V(KD), the higher the frequency of determination that knocking has not occurred becomes when knocking has occurred.

In order to suppress increase in knock determination level (KD) in this way, maximum value V(MAX) is removed from the frequency distribution (S414) when knock determination level (KD) is smaller than maximum value V(MAX) (YES in S412). The sum of the frequency of the removed maximum values V(MAX) is counted as knock proportion KC (S416).

In the frequency distribution from which maximum value (V)(MAX) has been removed, maximum value V(MAX) is determined again (S406). In other words, maximum value V(MAX) in the frequency distribution is corrected to be smaller.

Moreover, in the frequency distribution in which maximum value V(MAX) has been determined again, knock determination level V(KD) is calculated again (S410). In other words, knock determination level V(KD) in the frequency distribution of magnitude values LOG(V) equal to or smaller than maximum value V(MAX) which has been determined again is calculated again. As far as knock determination level V(KD) is smaller than maximum value V(MAX) (YES in S412), processings in S406 to S416 are repeated.

Figure 21:
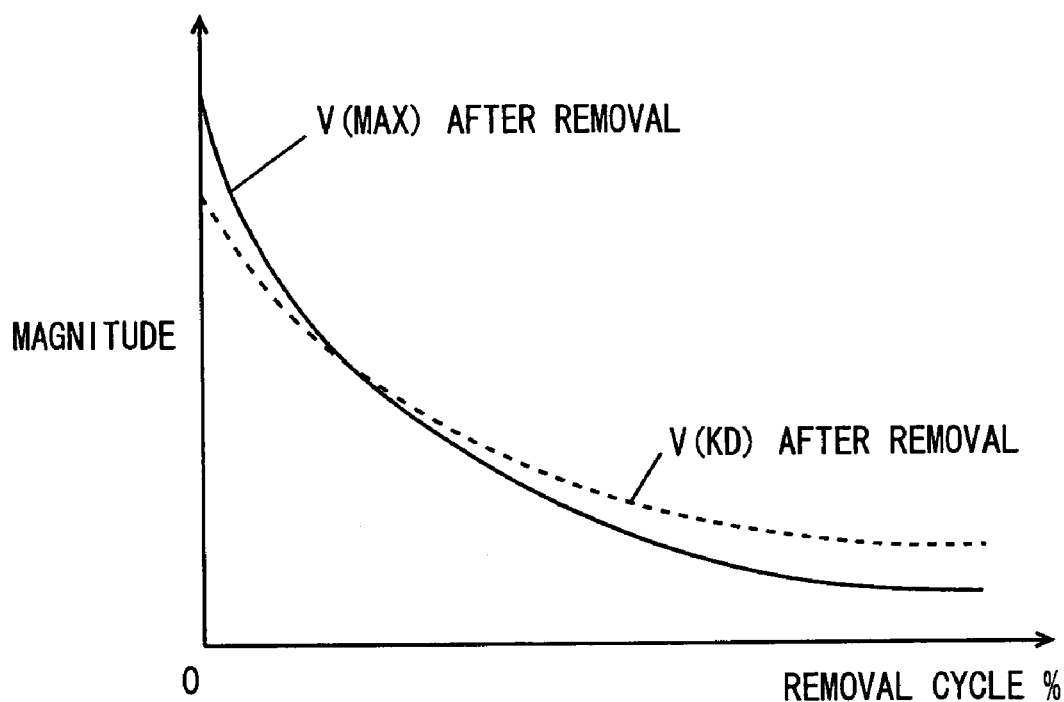
FIG. 21 is a chart showing progressions of V(KD) and V(MAX)

If maximum value V(MAX) is removed and knock determination level V(KD) is calculated again, as shown in FIG. 21, the more the maximum values V(MAX) are removed (the smaller the maximum value V(MAX) in the frequency distribution becomes), the smaller the knock determination level V(KD) becomes. Because a rate of reduction in maximum value V(MAX) is greater than a rate of reduction in knock determination level V(KD), there is a point at which both of them agree with each other.

Figure 22:
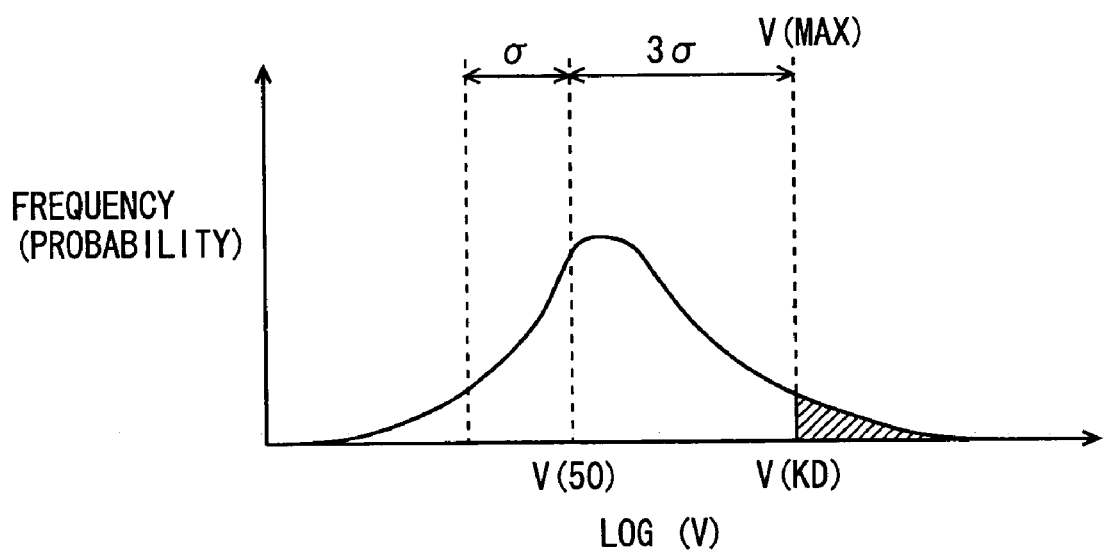
FIG. 22 is a chart (No. 6) showing frequency distribution of magnitude values LOG(V)

As described above, in the frequency distribution in which knocking is not generated, maximum value V(MAX) and knock determination level V(KD) agree with each other. Therefore, as shown in FIG. 22, if maximum value V(MAX) and knock determination level V(KD) agree with each other (NO in S412); it can be said that this knock determination level V(KD) imitates knock determination level V(KD) in the frequency distribution in which knocking is not generated.

Therefore, the sum of frequency of magnitude value LOG(V) greater than knock determination level V(KD) (maximum value V(MAX)) when maximum value V(MAX) and knock determination level V(KD) agree with each other, i.e., frequency of maximum value V(MAX) removed until maximum value V(MAX) and knock determination level V(KD) agree with each other is counted as knock proportion KC (frequency of occurrence of knocking) (S416).

Figure 23:
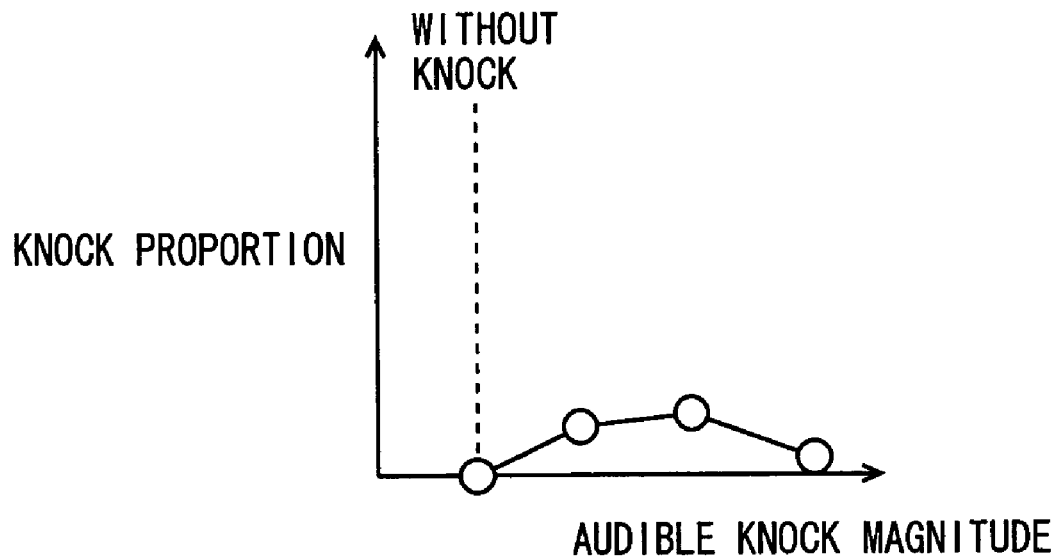
FIG. 23 is a chart (No. 1) showing a relationship between an audible knock magnitude and a knock proportion.

FIG. 23 shows progression of knock proportion KC when knock proportion KC is counted by using knock determination level V(KD) calculated without removing maximum value V(MAX). In this case, when audible knock magnitude (magnitude perceptible by the sense of hearing of a passenger) increases from a state without knocking, knock proportion KC increases. However, because knock determination level V(KD) increases as maximum value V(MAX) increases, knock proportion KC decreases conversely when the audible knock magnitude is excessively large.

Figure 24:
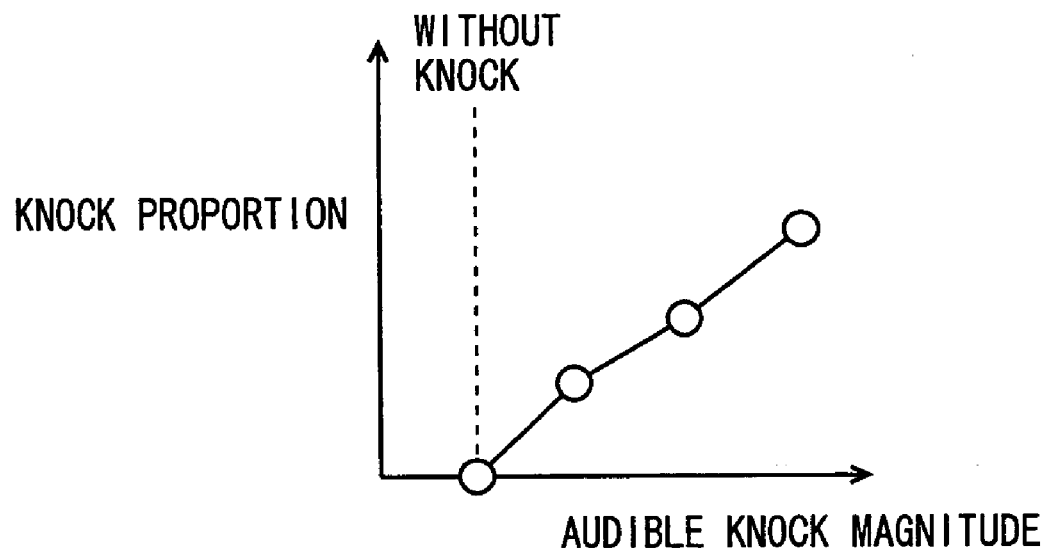
FIG. 24 is a chart (No. 2) showing the relationship between the audible knock magnitude and the knock proportion.

On the other hand, as shown in FIG. 24, if magnitude values V(X) are removed until maximum value V(MAX) and knock determination level V(KD) agree with each other to calculate knock determination level V(KD) again, knock proportion KC increases as audible knock magnitude increases. Thus, it is possible to detect knock proportion KC with accuracy.

When knock proportion KC is greater than threshold value KC(0) (YES in S418), it can be said that knocking occurs with higher frequency than acceptable frequency. In this case, in order to make it easier to determine that knocking is generated, determination value V(KX) is decreased (S420). Thus, frequency of determined that knocking has occurred is increased and the ignition timing is retarded to thereby suppress occurrence of knocking.

On the other hand, when knock proportion KC is smaller than threshold value KC(0) (NO in S418), it can be said that frequency of occurrence of knocking is within an acceptable limit. In this case, it can be said that output of engine 100 may be further increased.

Therefore, determination value V(KX) is increased (S422). Thus, frequency of determination that knocking has occurred is suppressed and the ignition timing is advanced to thereby increase output of engine 100.

As described above, with engine ECU 200 which is the ignition timing control device according to the embodiment, frequency distribution is formed by using magnitude values LOG(V) in the ignition cycle in which correlation coefficient K is greater than threshold value K(1) and knock proportion KC, i.e., frequency (the number of times) of occurrence of knocking is determined. Threshold value K(1) is maximum value of correlation coefficients K calculated when engine is operated so that the vibration waveform of in the ignition cycle in which magnitude values LOG(V) are calculated includes the vibration waveform of the noise component. In this way, in the frequency distribution of magnitude values LOG(V), it is possible to suppress magnitude value LOG(V) which is considered to be magnitude value LOG(V) of vibration of the noise component. Therefore, an influence of vibration of the noise component can be suppressed to determine the number of times that knocking has occurred. As a result, it is possible to determine the number of times that knocking has occurred with accuracy. Based on the number of times of occurrence of knocking which has been determined in this manner, correction of determination value V(KX) is prohibited. At this time, if the load of the engine is higher than the predetermined load or when the difference between the ignition timing and MBT is smaller than the predetermined value, correction of determination value V(KX) is prohibited. Thus, in the range in which knocking is unlikely to occur, it is possible to suppress correction of determination value V(KX) which makes knocking more likely to occur. Moreover, in the high-load range in which high output is require, it is possible to suppress correction of determination value V(KX) which makes the ignition timing more likely to be retarded to reduce output.

Figure 25:
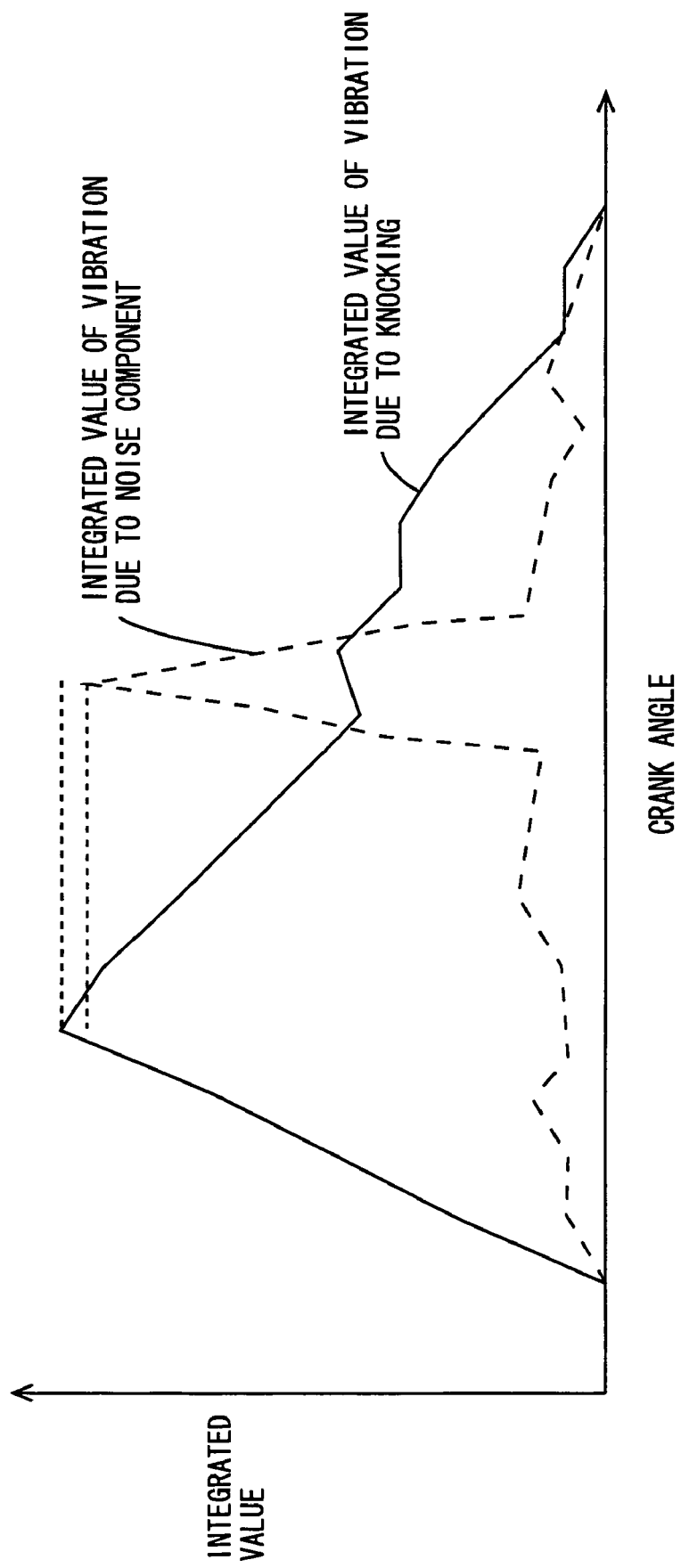
FIG. 25 is a chart (No. 1) showing an integrated value at the time of knocking and an integrated value by noise.
Figure 26:
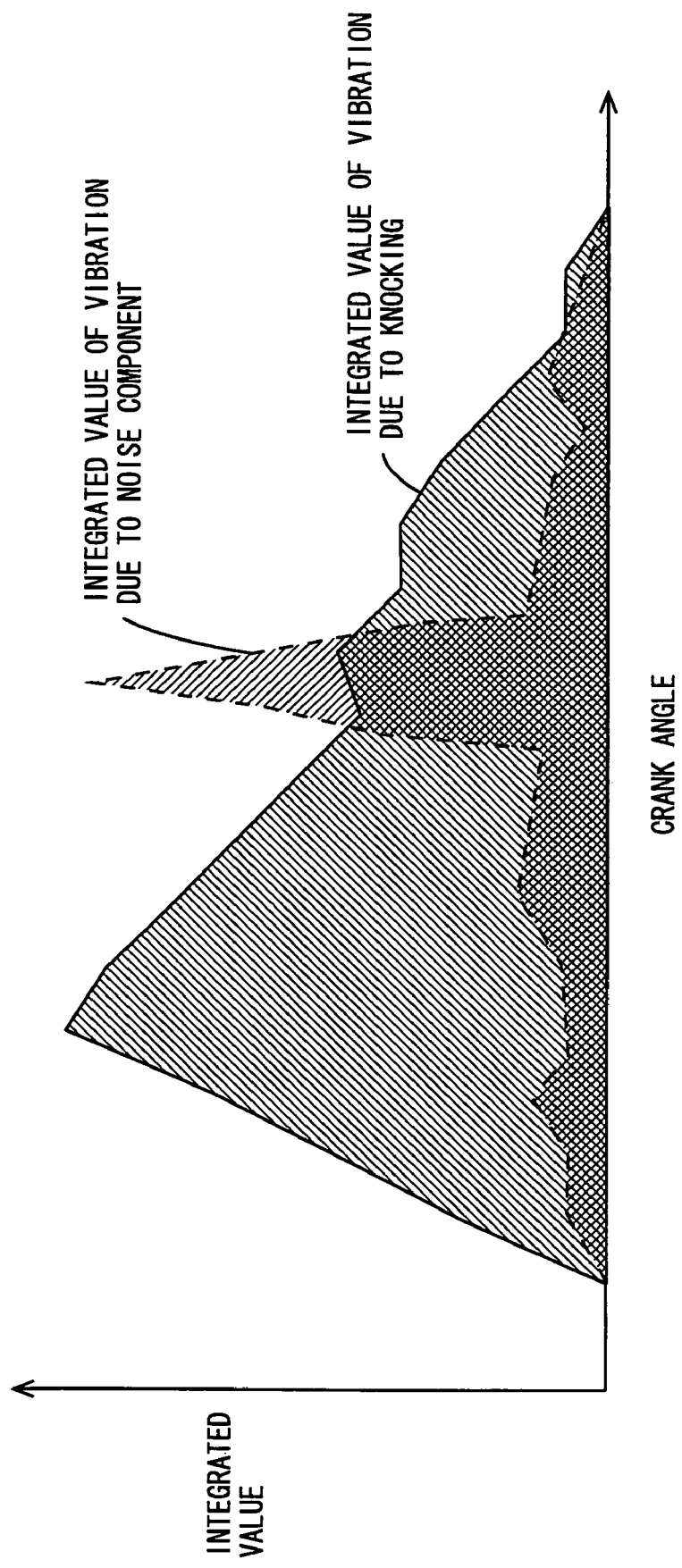
FIG. 26 is a chart (No. 2) showing an integrated value at the time of knocking and an integrated value by noise.

As shown in FIG. 25, when magnitude of vibration due to noise is large, the difference between the maximum value of the integrated values at the time of knocking and the maximum value of the integrated values due to noise is small and it may be difficult to distinguish between knocking and noise from knocking magnitude N. Therefore, as shown in FIG. 26, it is also possible to calculate knock magnitude N by using the sum of the integrated values in the vibration waveform (a value obtained by integrating all output voltages of knock sensor 300 in the knock detection gate) instead of the peak value P of the integrated values. In other words, it is also possible to calculate knock magnitude N by dividing the product of correlation coefficient K and the sum of the integrated values in the vibration waveform by BGL.

As shown in FIG. 26, because a period in which vibrations due to noise occur is shorter than a period in which vibrations due to knocking occur, a difference between the sum of integrated values of knocking and that of noise may be large. Therefore, by calculating knock magnitude N based on the sum of the integrated values, it is possible to obtain a large difference between knock magnitude N calculated at the time of knocking and knock magnitude N calculated as a result of noise. Thus, it is possible to clearly distinguish between vibration due to knocking and vibration due to noise.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An ignition timing control device of an internal combustion engine, said device comprising:
a knock magnitude calculating portion for calculating knock magnitude related to magnitude of vibration due to knocking based on magnitude of vibration occurring in said internal combustion engine;
a control portion for controlling ignition timing of said internal combustion engine based on a result of comparison between said knock magnitude and a predetermined determination value;
a waveform detecting portion for detecting a waveform of the vibration occurring in said internal combustion engine at predetermined intervals;
a memory portion for storing a waveform which is a standard of the vibration of said internal combustion engine;
a detecting portion for detecting magnitude values related to the magnitude of the vibration occurring in said internal combustion engine in a plurality of ignition cycles;
an extracting portion for extracting a magnitude value satisfying a predetermined first condition from said plurality of magnitude values based on a result of comparison between said detected waveform and said stored waveform;
a correcting portion for correcting said predetermined determination value based on said extracted magnitude value; and
a prohibiting portion for prohibiting correction of said predetermined determination value when a predetermined second condition is satisfied.

2. The ignition timing control device of the internal combustion engine according to claim 1, wherein
said predetermined intervals are predetermined intervals of a crank angle.

3. The ignition timing control device of the internal combustion engine according to claim 1, wherein
the waveform which is the standard of the vibration of said internal combustion engine is stored in advance.

4. The ignition timing control device of the internal combustion engine according to claim 1, wherein
said predetermined second condition is a condition that a load of said internal combustion engine is higher than a predetermined load.

5. The ignition timing control device of the internal combustion engine according to claim 1, wherein
said predetermined second condition is a condition that a load of said internal combustion engine is lower than a predetermined load.

6. The ignition timing control device of the internal combustion engine according to claim 1, wherein
said predetermined second condition is a condition that a difference between the ignition timing of said internal combustion engine and predetermined ignition timing is smaller than a predetermined value.

7. The ignition timing control device of the internal combustion engine according to claim 1, said device further comprising:
a deviation calculating portion for calculating a value related to a deviation of said detected waveform and said stored waveform from each other, wherein
said deviation calculating portion calculates the value related to said deviation as a smaller value when said detected waveform includes a waveform of vibration due to actuation of a predetermined part of said internal combustion engine than that when said detected waveform does not include it,
said predetermined first condition is a condition that the magnitude value is a magnitude value in an ignition cycle in which a greater value related to the deviation than a predetermined value is calculated, and
said knock magnitude calculating portion calculates said knock magnitude based on the value related to said deviation and the magnitude of the vibration occurring in said internal combustion engine at said predetermined intervals.

8. The ignition timing control device of the internal combustion engine according to claim 7, said device further comprising:
an integrated value calculating portion for calculating an integrated value obtained by integrating the magnitude of the vibration occurring in said internal combustion engine at said predetermined intervals for said predetermined interval, wherein
said knock magnitude calculating portion calculates said knock magnitude based on a product of the value related to said deviation and said integrated value.

9. The ignition timing control device of the internal combustion engine according to claim 7, wherein
said predetermined value is a maximum value of values related to a deviation calculated when said internal combustion engine is operated so that the vibration due to actuation of said predetermined part occurs at said predetermined intervals.

10. The ignition timing control device of the internal combustion engine according to claim 7, wherein
said predetermined part is at least one of a piston, an injector, a suction valve, and an exhaust valve.

11. The ignition timing control device of the internal combustion engine according to claim 1, said device further comprising:
a level calculating portion for calculating a knock determination level based on said extracted magnitude value, wherein
said correcting portion corrects said predetermined determination value based on a result of a comparison between said extracted magnitude value and said knock determination level.

12. The ignition timing control device of the internal combustion engine according to claim 11, wherein
said correcting portion corrects said predetermined determination value when a frequency with which the magnitude value greater than said knock determination level is extracted is higher than a predetermined frequency.

13. The ignition timing control device of the internal combustion engine according to claim 11, wherein
said level calculating portion calculates said knock determination level by adding a product of a standard deviation in said extracted magnitude value and a predetermined coefficient to a median value in said extracted magnitude value.

14. The ignition timing control device of the internal combustion engine according to claim 1, said device further comprising:
a fuel-by-fuel control portion for controlling the ignition timing according to a type of fuel of said internal combustion engine.

15. The ignition timing control device of the internal combustion engine according to claim 14, wherein
said fuel-by-fuel control portion controls the ignition timing of said internal combustion engine when correction of at least said predetermined determination value is prohibited.

16. An ignition timing control device of an internal combustion engine, said device comprising:
a detecting portion for detecting vibration due to knocking;
a control portion for controlling ignition timing by comparing a value representing a characteristic of the vibration of the knocking with a predetermined threshold value;
a correcting portion for correcting said threshold value based on a frequency of occurrence of the knocking; and
a prohibiting portion for prohibiting correction of said threshold value when a predetermined condition is satisfied.

17. An ignition timing control device of an internal combustion engine, said device comprising:
knock magnitude calculating means for calculating knock magnitude related to magnitude of vibration due to knocking based on magnitude of vibration occurring in said internal combustion engine;
control means for controlling ignition timing of said internal combustion engine based on a result of comparison between said knock magnitude and a predetermined determination value;
means for detecting a waveform of the vibration occurring in said internal combustion engine at predetermined intervals;
means for storing a waveform which is a standard of the vibration of said internal combustion engine;
detecting means for detecting magnitude values related to the magnitude of the vibration occurring in said internal combustion engine in a plurality of ignition cycles;
extracting means for extracting a magnitude value satisfying a predetermined first condition from said plurality of magnitude values based on a result of comparison between said detected waveform and the stored waveform;
correcting means for correcting said predetermined determination value based on said extracted magnitude value; and
prohibiting means for prohibiting correction of said predetermined determination value when a predetermined second condition is satisfied.

18. The ignition timing control device of the internal combustion engine according to claim 17, wherein
said predetermined intervals are predetermined intervals of a crank angle.

19. The ignition timing control device of the internal combustion engine according to claim 17, wherein
the waveform which is the standard of the vibration of said internal combustion engine is stored in advance.

20. The ignition timing control device of the internal combustion engine according to claim 17, wherein
said predetermined second condition is a condition that a load of said internal combustion engine is higher than a predetermined load.

21. The ignition timing control device of the internal combustion engine according to claim 17, wherein
said predetermined second condition is a condition that a load of said internal combustion engine is lower than a predetermined load.

22. The ignition timing control device of the internal combustion engine according to claim 17, wherein
said predetermined second condition is a condition that a difference between the ignition timing of said internal combustion engine and predetermined ignition timing is smaller than a predetermined value.

23. The ignition timing control device of the internal combustion engine according to claim 17, said device further comprising:

deviation calculating means for calculating a value related to a deviation of said detected waveform and said stored waveform from each other, wherein said deviation calculating means includes means for calculating the value related to said deviation as a smaller value when said detected waveform includes a waveform of vibration due to actuation of a predetermined part of said internal combustion engine than that when said detected waveform does not include it, said predetermined first condition is a condition that the magnitude value is a magnitude value in an ignition cycle in which a greater value related to the deviation than a predetermined value is calculated, and said knock magnitude calculating means includes means for calculating said knock magnitude based on the value related to said deviation and the magnitude of the vibration occurring in said internal combustion engine at said predetermined intervals.

24. The ignition timing control device of the internal combustion engine according to claim 23, said device further comprising:

means for calculating an integrated value obtained by integrating the magnitude of the vibration occurring in said internal combustion engine at said predetermined intervals for said predetermined interval, wherein said knock magnitude calculating means includes means for calculating said knock magnitude based on a product of the value related to said deviation and said integrated value.

25. The ignition timing control device of the internal combustion engine according to claim 23, wherein said predetermined value is a maximum value of values related to a deviation calculated when said internal combustion engine is operated so that the vibration due to actuation of said predetermined part occurs at said predetermined intervals.

26. The ignition timing control device of the internal combustion engine according to claim 23, wherein said predetermined part is at least one of a piston, an injector, a suction valve, and an exhaust valve.

27. The ignition timing control device of the internal combustion engine according to claim 17, said device further comprising:

level calculating means for calculating a knock determination level based on said extracted magnitude value, wherein said correcting means includes means for correcting said predetermined determination value based on a result of a comparison between said extracted magnitude value and said knock determination level.

28. The ignition timing control device of the internal combustion engine according to claim 27, wherein said correcting means includes means for correcting said predetermined determination value when a frequency with which the magnitude value greater than said knock determination level is extracted is higher than a predetermined frequency.

29. The ignition timing control device of the internal combustion engine according to claim 27, wherein said level calculating means includes means for calculating said knock determination level by adding a product of a standard deviation in said extracted magnitude value and a predetermined coefficient to a median value in said extracted magnitude value.

30. The ignition timing control device of the internal combustion engine according to claim 17, said device further comprising:

fuel-by-fuel control means for controlling the ignition timing according to a type of fuel of said internal combustion engine.

31. The ignition timing control device of the internal combustion engine according to claim 30, wherein said fuel-by-fuel control means includes means for controlling the ignition timing of said internal combustion engine when correction of at least said predetermined determination value is prohibited.

32. An ignition timing control device of an internal combustion engine, said device comprising:

means for detecting vibration due to knocking;

means for controlling ignition timing by comparing a value representing a characteristic of the vibration of the knocking with a predetermined threshold value;

means for correcting said threshold value based on a frequency of occurrence of the knocking; and means for prohibiting correction of said threshold value when a predetermined condition is satisfied.

* * * * *